Dec. 14, 1943. H. GOLDBERG 2,336,478
NUT TAPPING MACHINE
Filed March 13, 1940 15 Sheets-Sheet 1
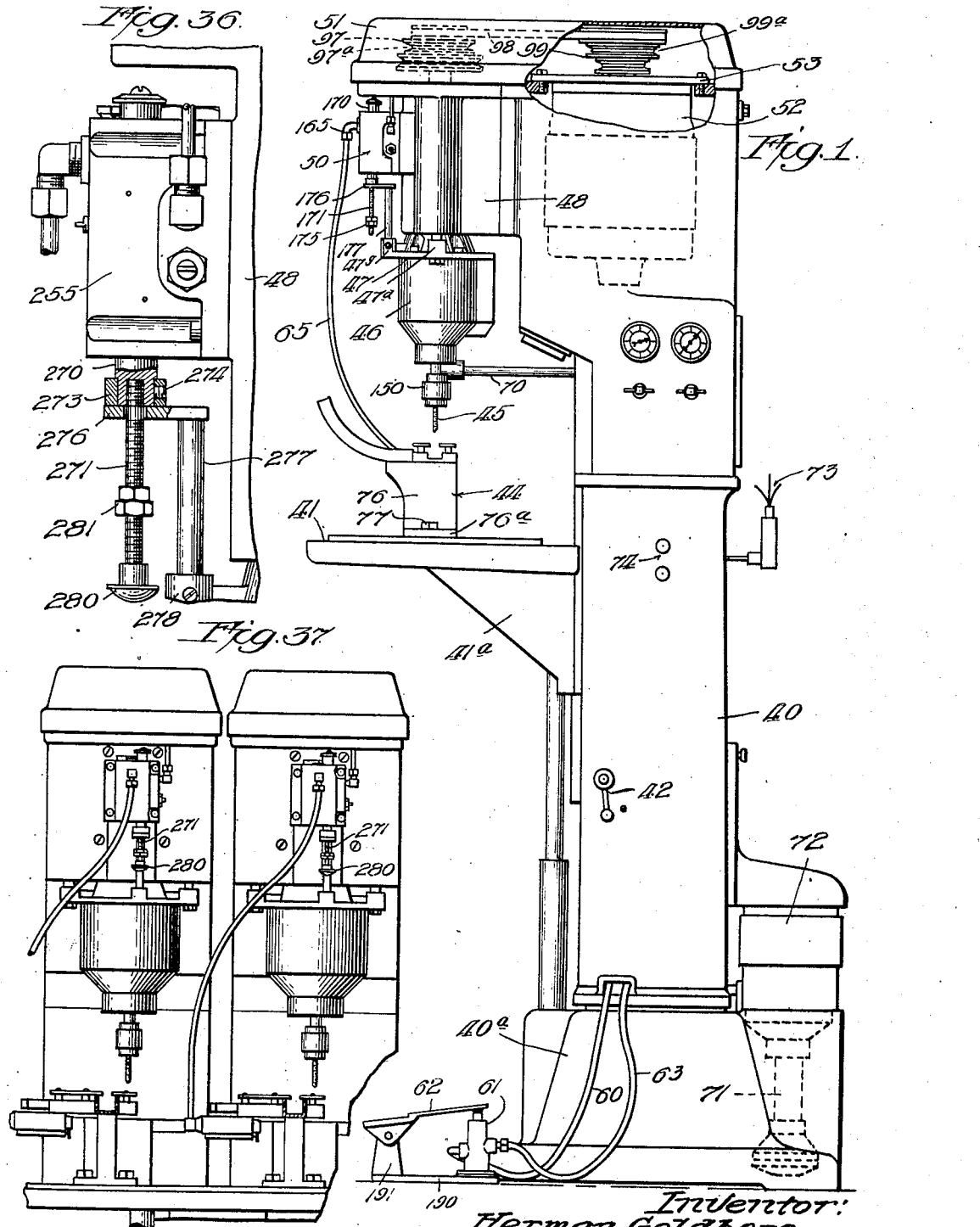
Inventor:
Herman Goldberg
by Davis, Lindsey, Smith & Shonts
Attys Dec. 14, 1943.    H. GOLDBERG    2,336,478
NUT TAPPING MACHINE
Filed March 13, 1940    15 Sheets-Sheet 2
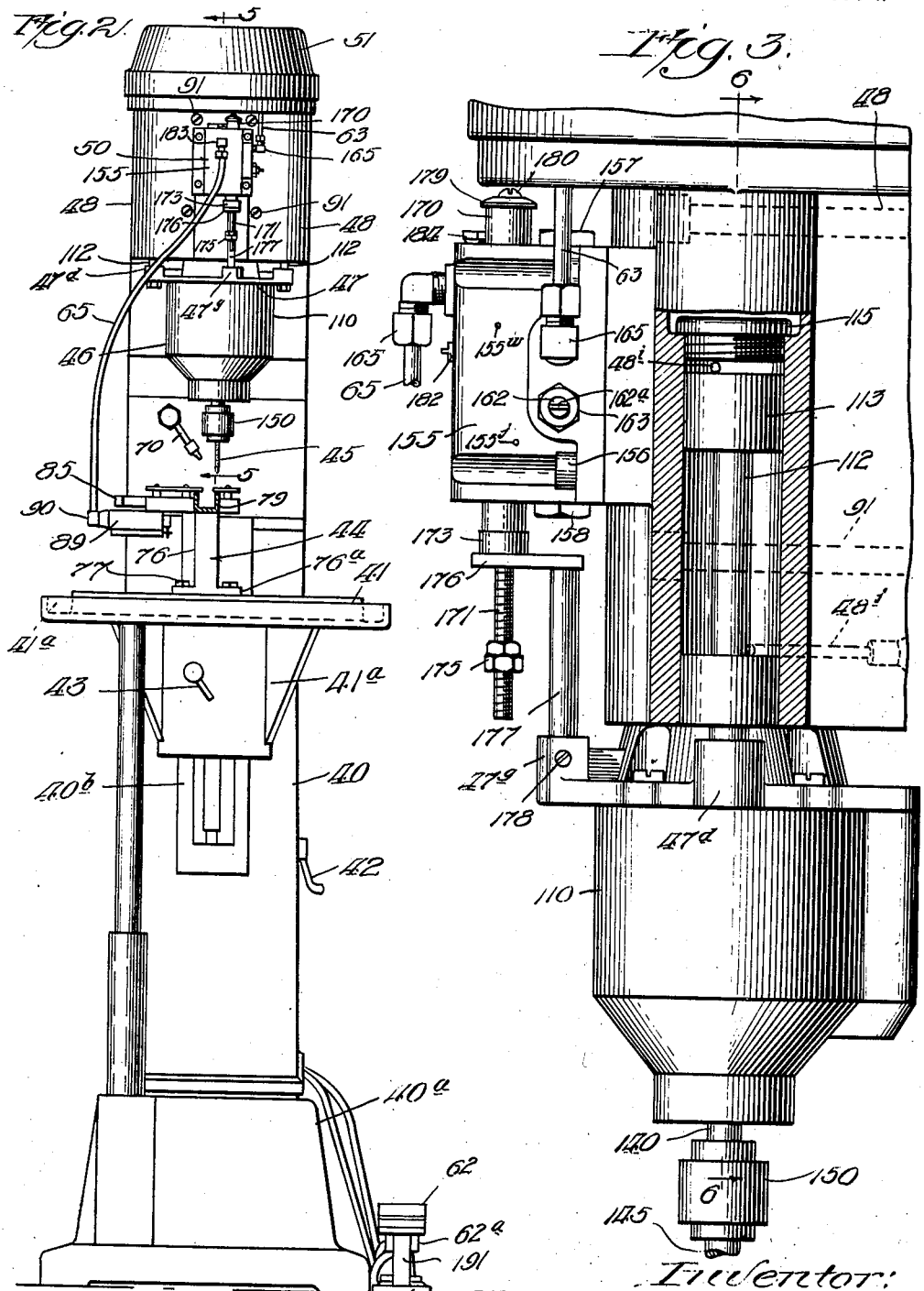
Inventor:
Herman Goldberg
by Davis, Lindsey, Smith & Shonts,
Attys.

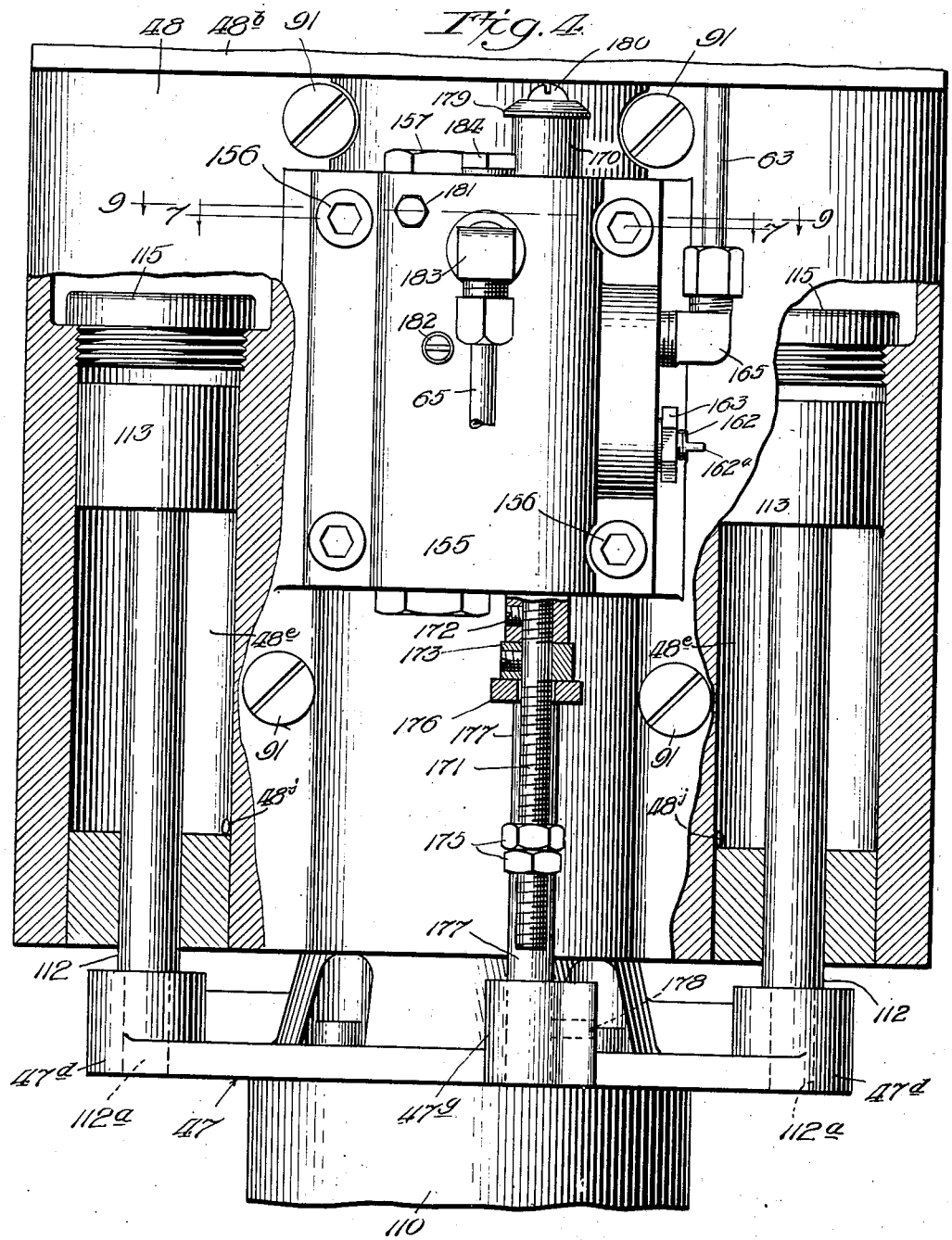

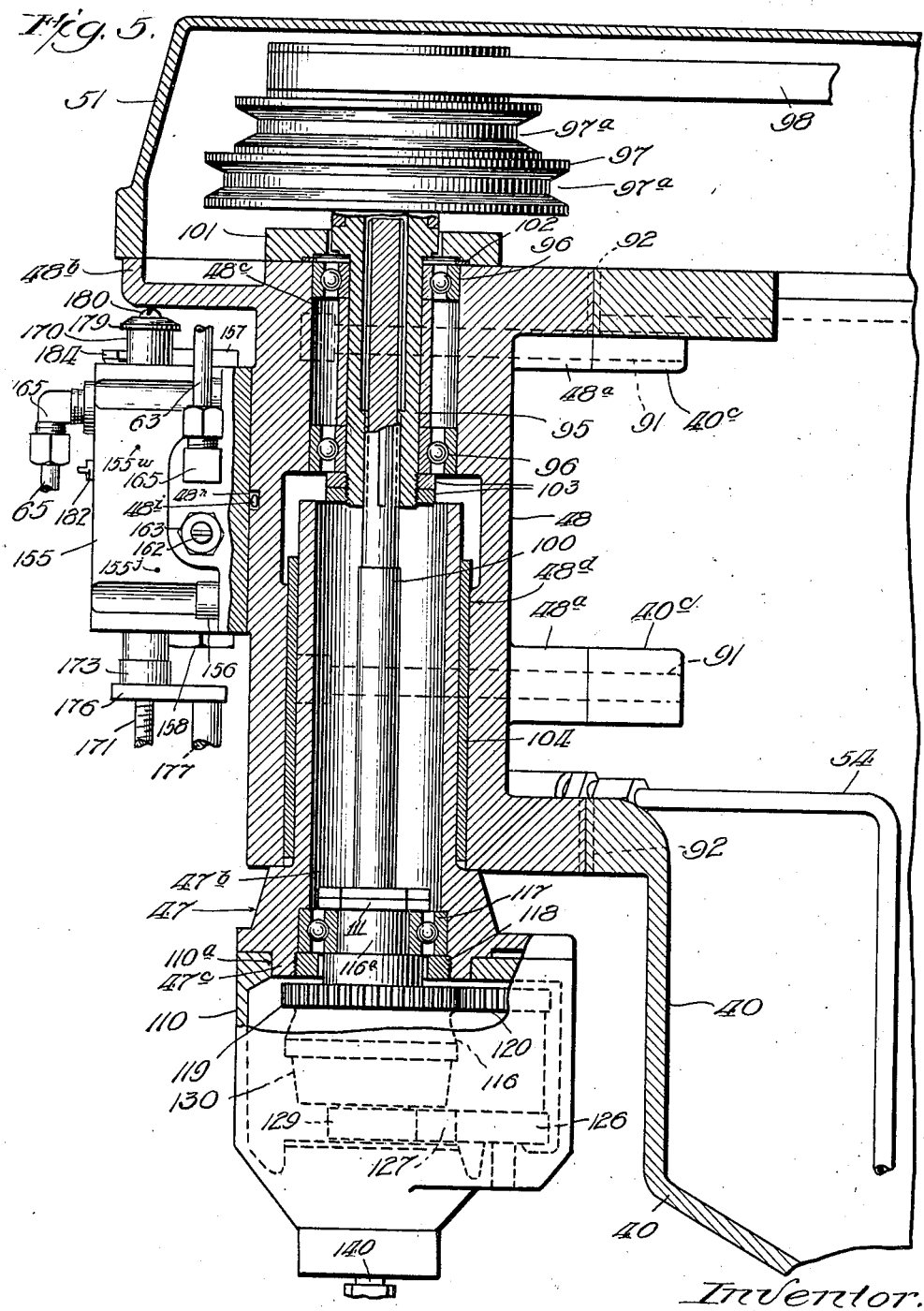

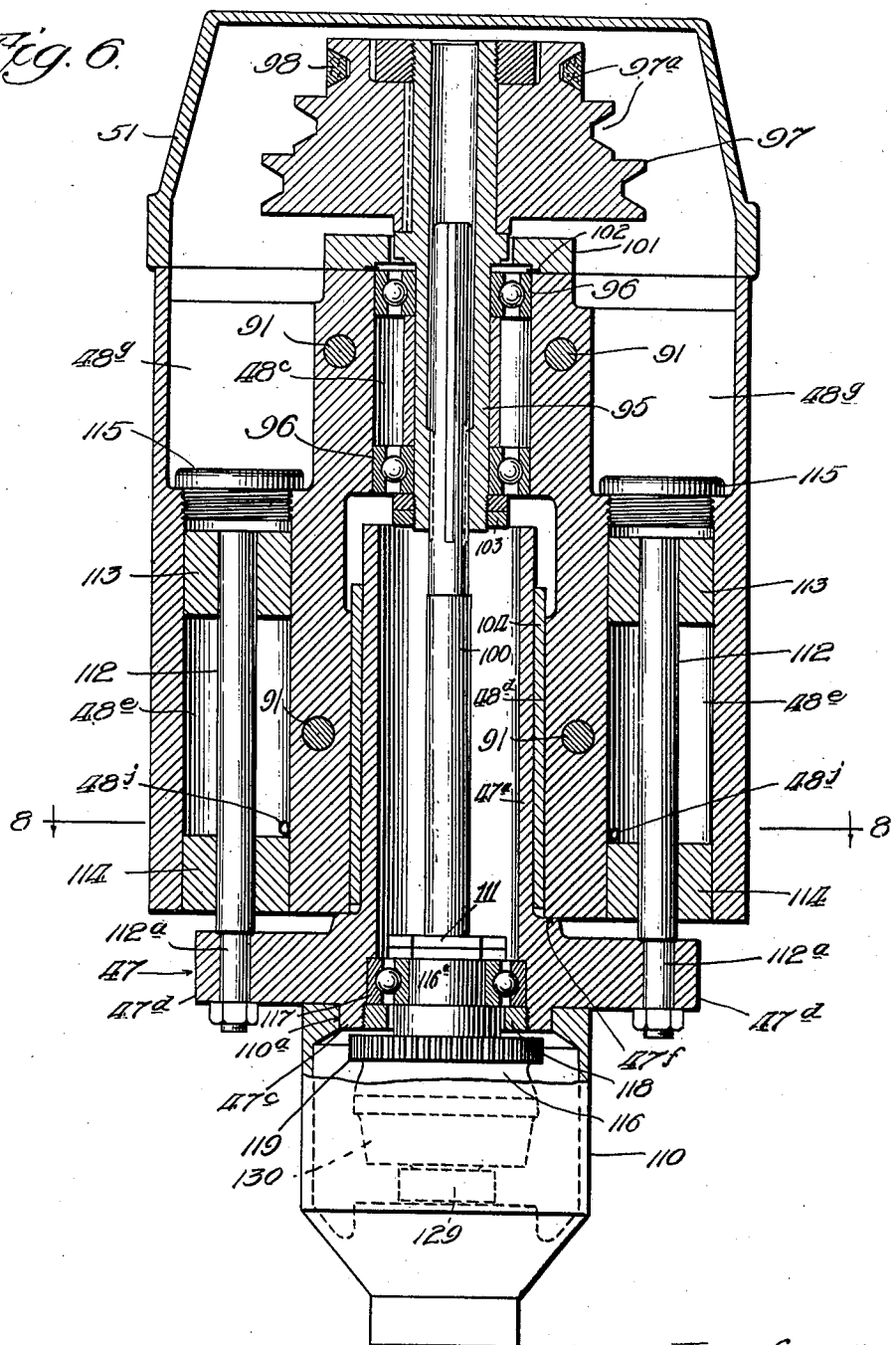

Dec. 14, 1943.    H. GOLDBERG    2,336,478
NUT TAPPING MACHINE
Filed March 13, 1940    15 Sheets-Sheet 6

Inventor:
Herman Goldberg
by Davis, Lindsey, Smith & Shonts,
attys.

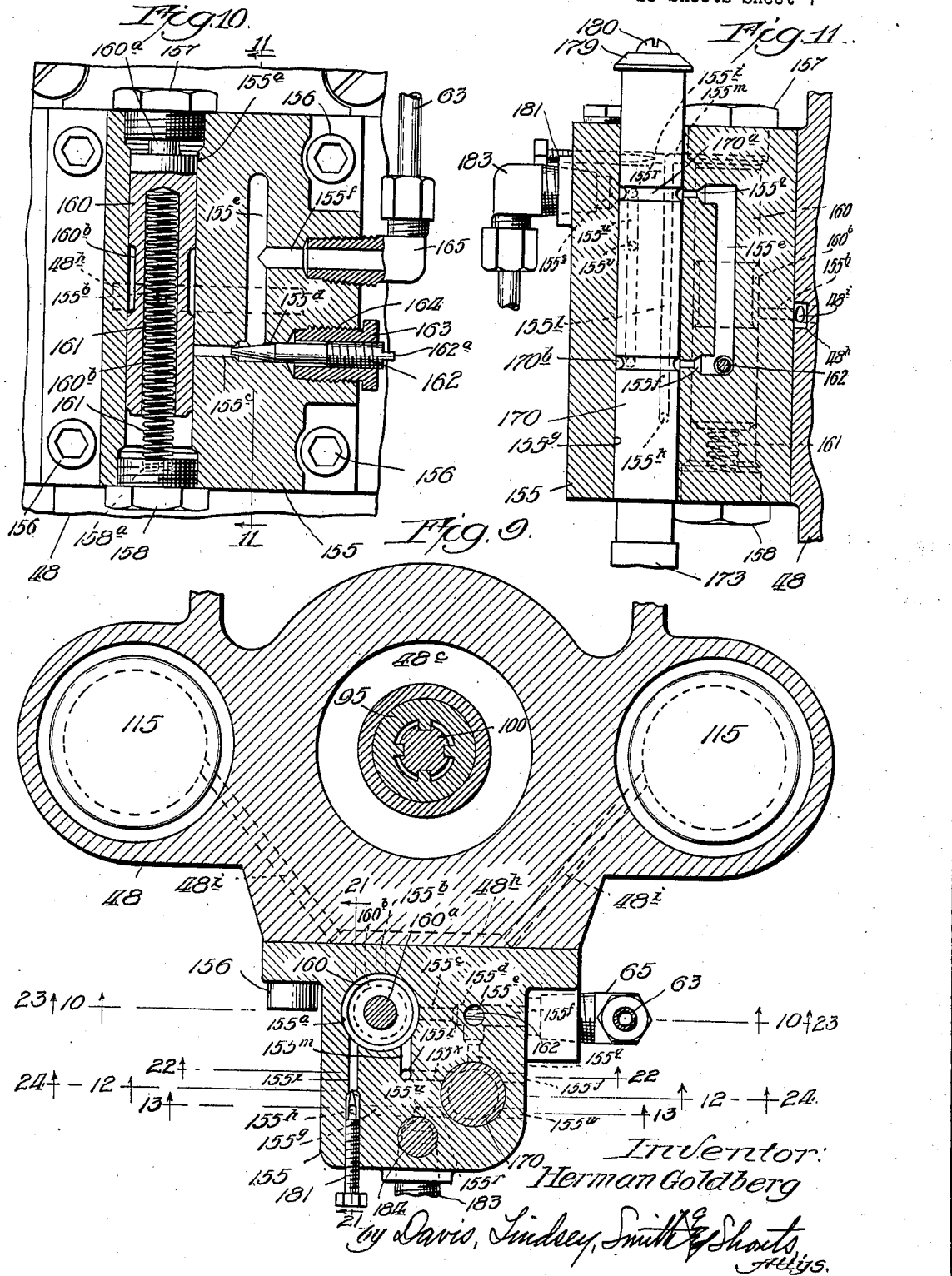

Dec. 14, 1943. H. GOLDBERG 2,336,478
NUT TAPPING MACHINE
Filed March 13, 1940 15 Sheets-Sheet 8

Inventor:
Herman Goldberg.
by Davis, Lindsey, Smith & Shonts,
Attys.

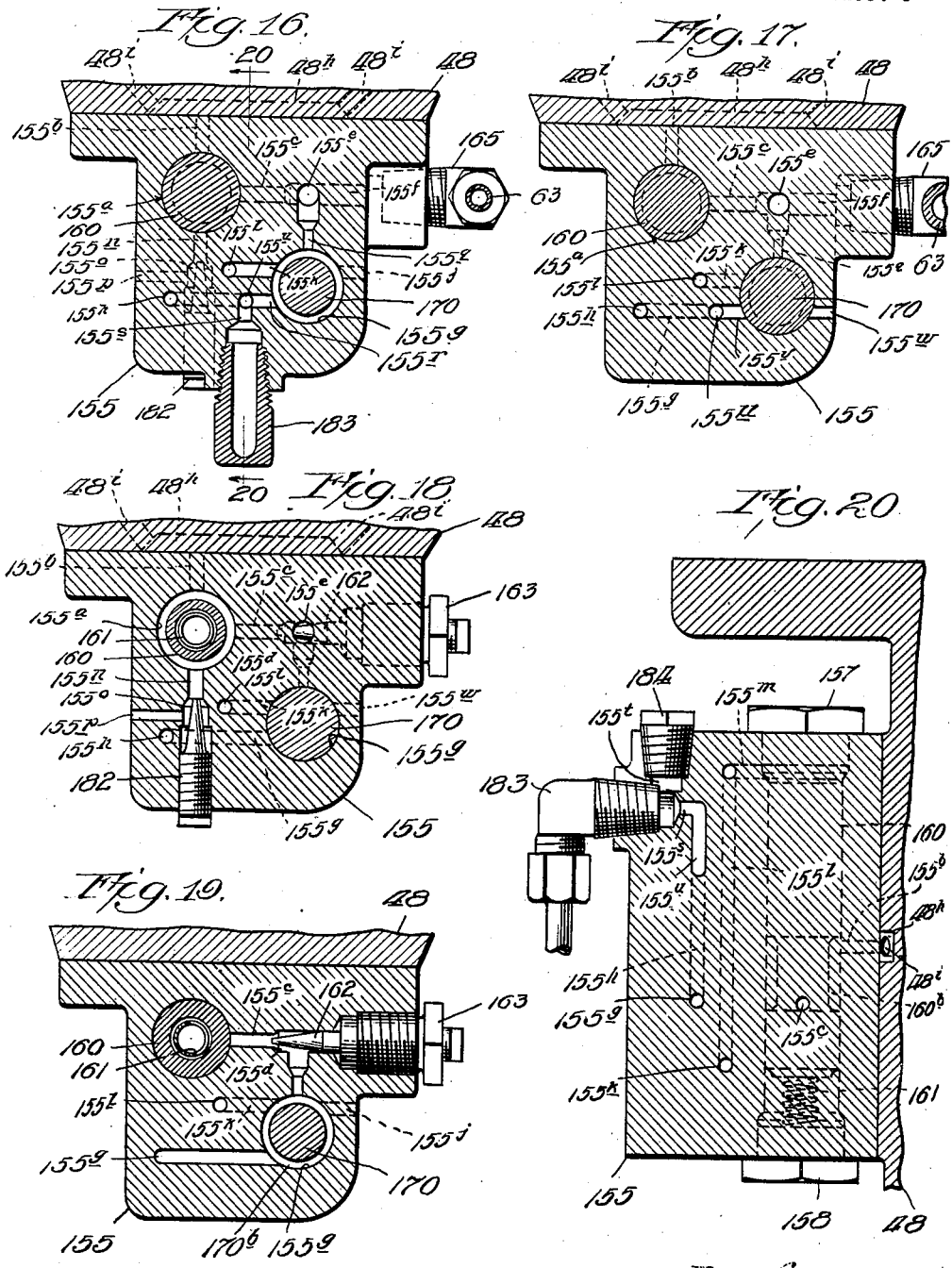

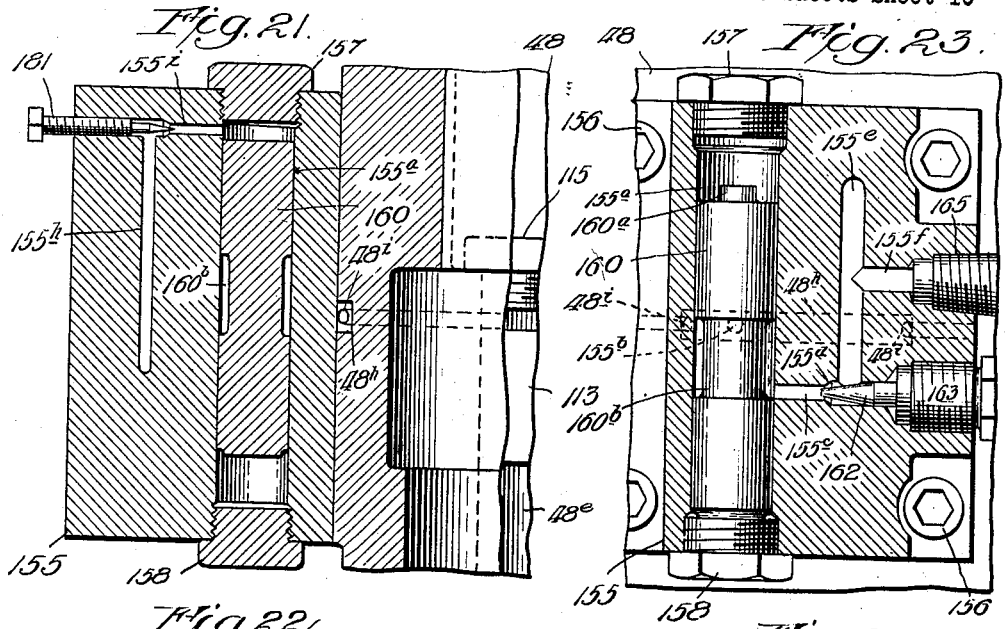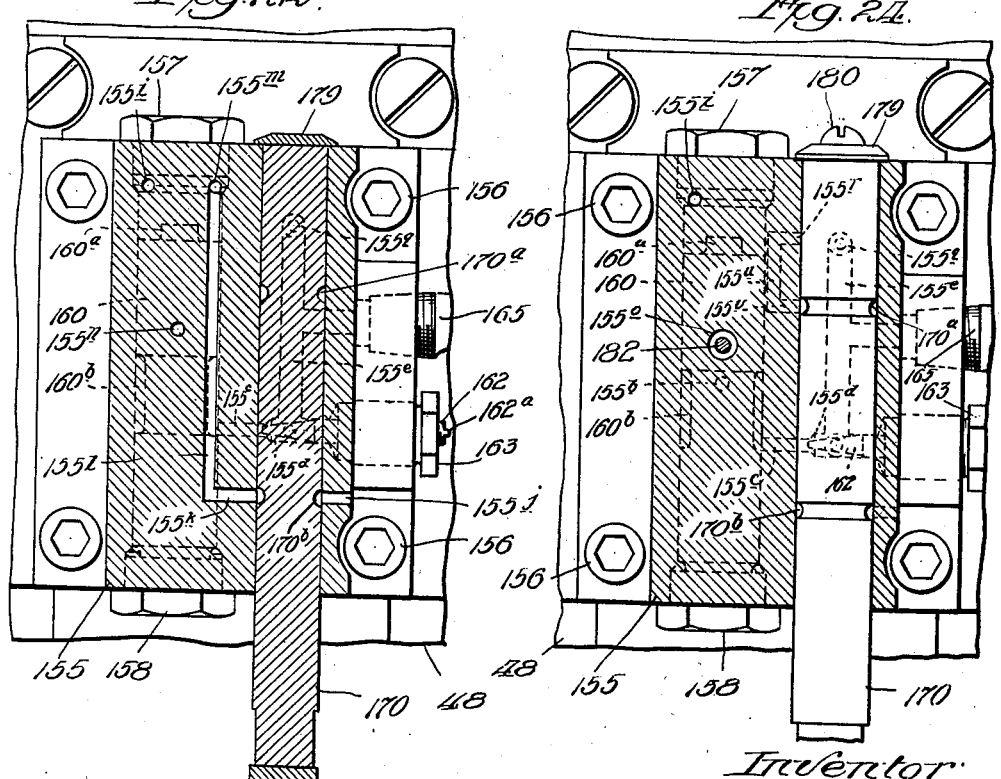

Inventor:
Herman Goldberg
by Davis, Lindsey, Smith & Shorts, Att'ys

Dec. 14, 1943.  H. GOLDBERG  2,336,478
NUT TAPPING MACHINE
Filed March 13, 1940  15 Sheets-Sheet 12

Inventor:
Herman Goldberg
by Davis, Lindsey, Smith & Shonts,
Attys

Dec. 14, 1943. H. GOLDBERG 2,336,478
NUT TAPPING MACHINE
Filed March 13, 1940 15 Sheets-Sheet 13
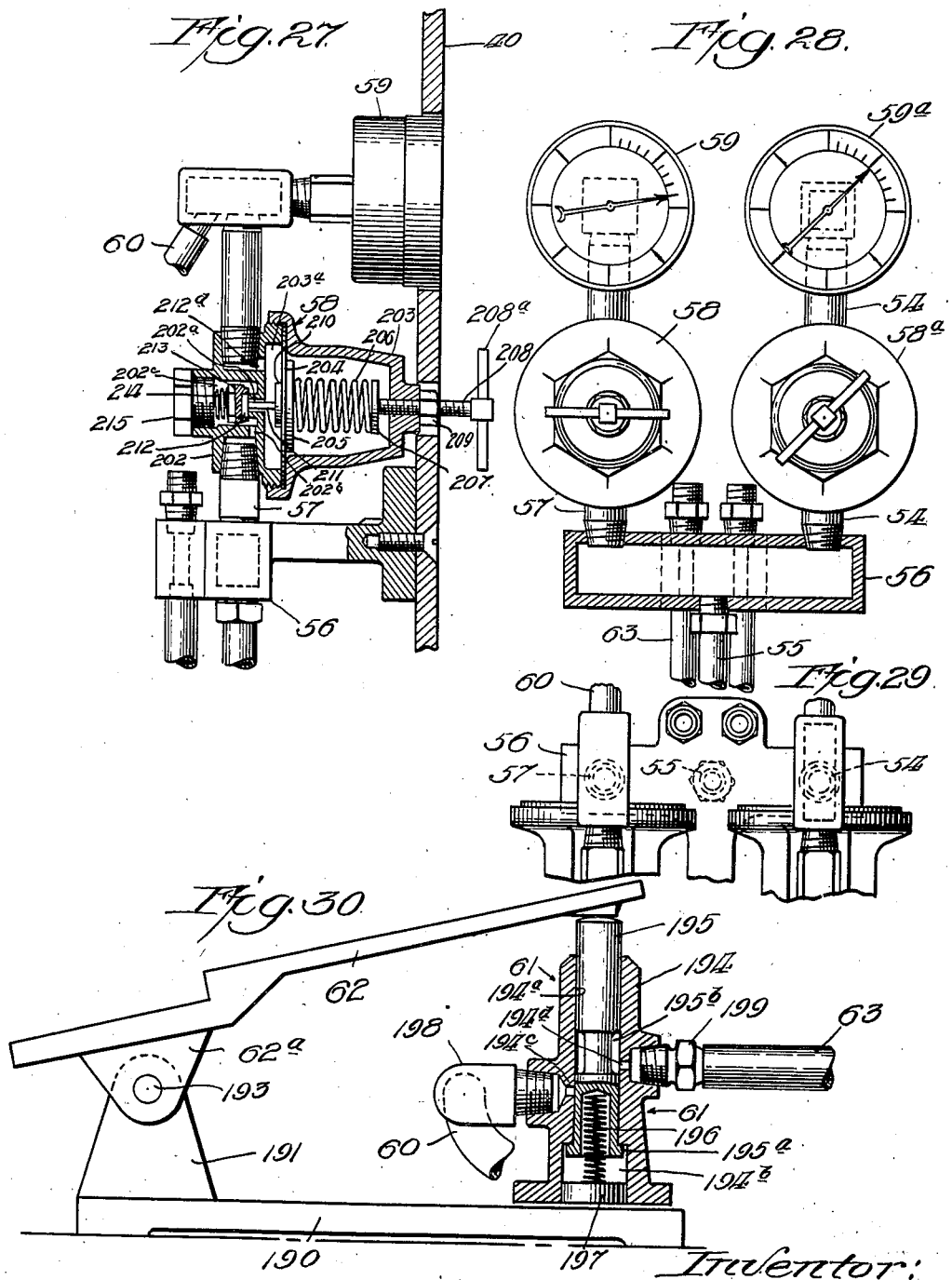
Inventor:
Herman Goldberg
by Davis, Lindsey, Smith & Shonts
Attys.

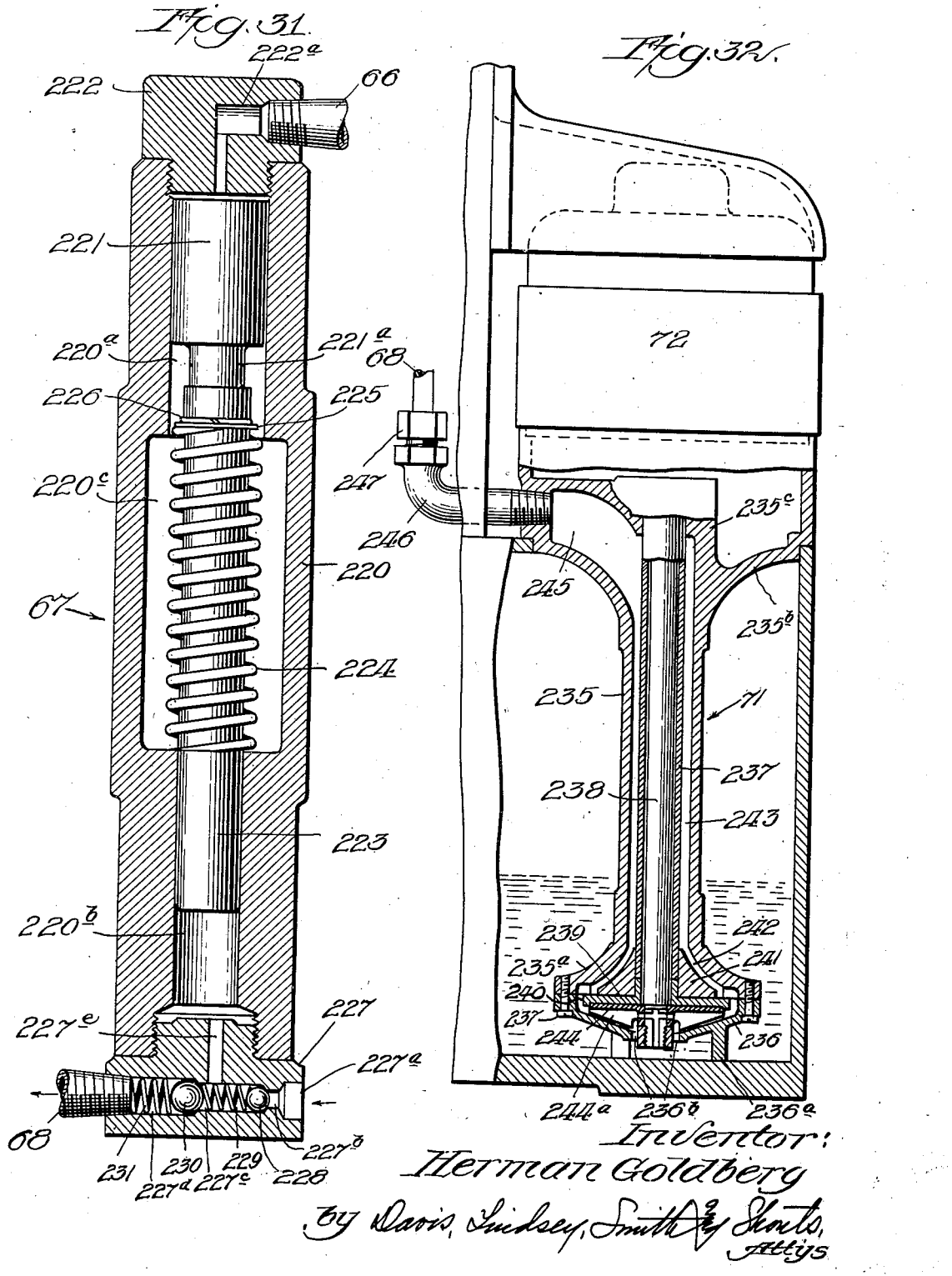

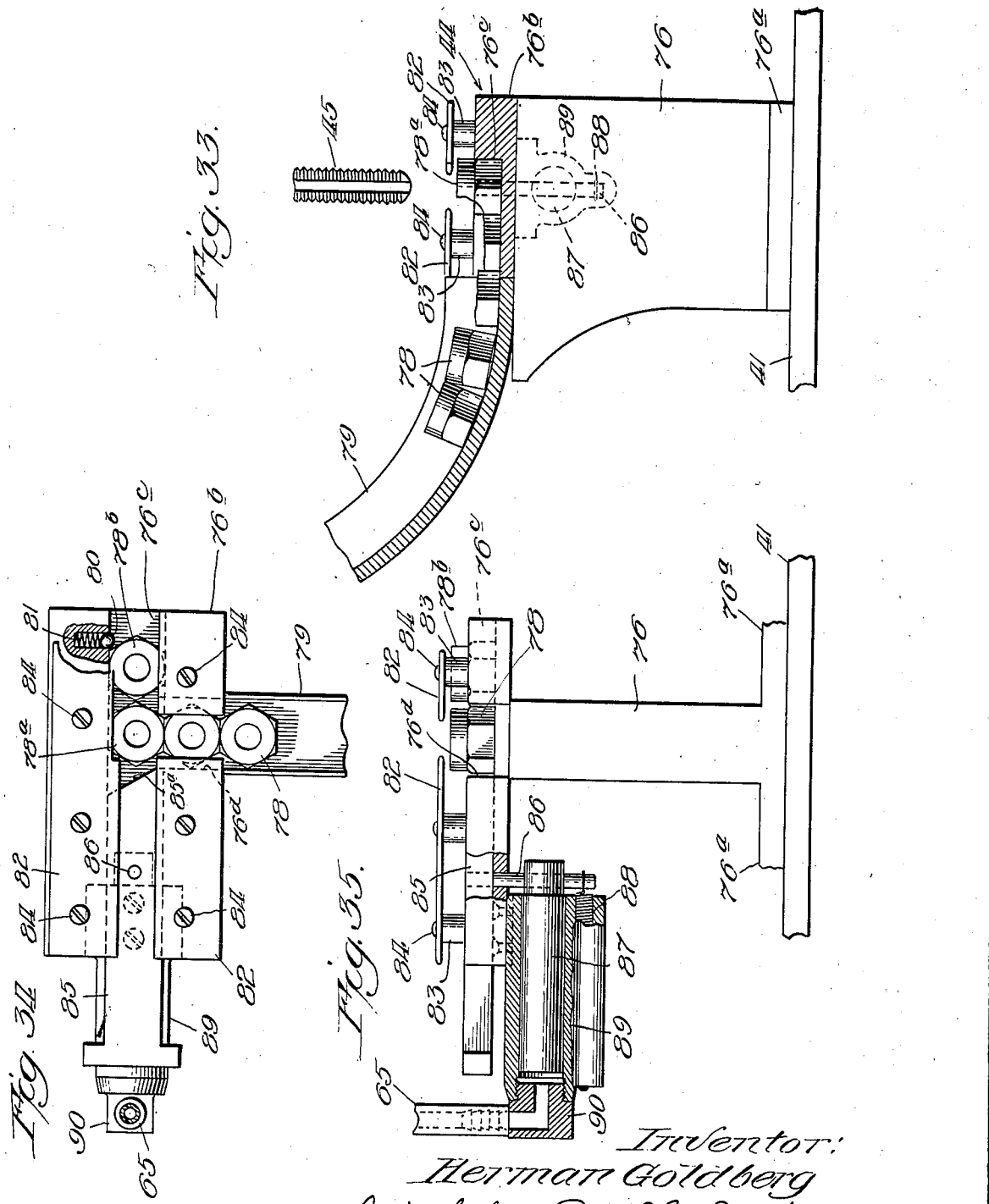

Patented Dec. 14, 1943

2,336,478

UNITED STATES PATENT OFFICE 2,336,478

NUT TAPPING MACHINE

Herman Goldberg, Chicago, Ill.

Application March 13, 1940, Serial No. 323,649

21 Claims. (Cl. 10—136)

This invention relates to improvements in machines for tapping nut blanks or the like or for performing other operations in which a rotating tool, or a plurality of tools, and the work are brought into engagement with each other, and its purpose is to provide a machine in which these operations are capable of being rapidly and automatically repeated by fluid pressure means so that a continuous cycle of operations is performed efficiently and with great speed.

Machines of this general type have heretofore been provided in which a relative movement has been effected between a rotating tap or other tool and a device adapted to hold a nut blank or other object to be worked upon, but most of these prior nut tapping machines which have gone into commercial use have been of the bent-shank type in which the nut blanks to be tapped are fed over a tapping tool having a bent shank, the tool being held by engagement with the surrounding nut blanks so that it has been impossible to hold the tapping portion of the tool in a sufficiently definite position to secure an accurate tapping of the nut blanks. There have been other commercial nut tapping machines in which the bent shank has not been employed, but these have been limited largely to use in tapping relatively large nuts and their speed of operation has been comparatively low. In some of these prior machines resilient means have been provided for permitting the tool-holding part or the work-holding part to yield and thereby prevent injury to the tool or other parts in the event that the work is defective or is not properly positioned for engagement by the tool, but the speed of operation of most of these prior machines has been limited and considerable pressure has been exerted upon the tap or other tool so that, when the work is defective or not properly positioned, the result has been that the tap or tool has deteriorated rapidly.

So far as applicant is aware, the only exception to the types of nut tapping machines and the like referred to above, so far as commercial use is concerned, is to be found in the type of machine described and claimed in applicant's co-pending application Serial No. 191,386, filed February 19, 1938, that machine being one in which the holder for the nut blank or other work is moved with respect to the rotating tap or other tool by fluid pressure sufficient to accomplish the tapping of the nut or the performance of any other desired operation, while at the same time permitting the movement of the work holder to be arrested in case the work is defective or not properly aligned with the tool. In the machine disclosed in said application, the movement of the work holder toward the operating tool is effected by fluid pressure and means are provided for regulating the speed and duration of the forward and return strokes of the work holder so that the work to be performed may be accomplished quickly and with accuracy while at the same time having the advantage that a continuous series of operations may be automatically carried on without attention on the part of the operator except in initiating the cycle. While the machine of said application has many advantages over prior art machines intended for like purposes, and has been found to be very successful in commercial use, it has the disadvantage that it is limited to use with pieces of work of relatively small size, such as nut blanks and the like, because of the fact that the work is moved toward and from the rotating tool and pieces of substantial size cannot be fed into position to be operated upon or moved toward and from the operating positions in the manner followed in the operation of that machine.

The principal object of the present invention is to overcome the limitations of the machine of said copending application and the deficiencies of the machines of the prior art referred to above by providing an improved machine adapted for use in tapping nut blanks or in performing other tapping and similar operations, wherein the nut blank or other work piece is held stationary while it is being operated upon and the rotating tap or other tool is moved toward and from the nut blank or work piece by fluid pressure operated means capable of being automatically controlled and of carrying on a continuous series of forward and reverse strokes so that a continuous cycle of operations may be performed without the necessity of moving the work piece, except in moving it to operative position and without attention on the part of the operator except in starting the cycle of operations. A further object of the invention is to provide an automatic machine of this type in which the rotating tool is automatically moved toward and from the work along with automatic reversing mechanism for driving the tool so that the fluid pressure operated means which is employed for effecting the forward and reverse strokes of the tool supporting and operating mechanism also performs the function of bringing about an automatic reversal of the direction of rotation of the tool at the proper points in each cycle of operations. Still another object of the invention is to provide an automatic machine tool capable of tapping nut blanks or performing other like operations and operated preferably by fluid pressure, wherein the fluid pressure is utilized for effecting a continuous series of forward and reverse strokes of a rotating tool with respect to the nut blanks or other work pieces, and also to move these blanks or work pieces to the position where they are engaged by the tool and for circulating a cooling fluid into contact with the work piece being operated upon and for performing other auxiliary operations which may be necessary to the efficient operation of the machine. A particular advantage of the improved machine is that it embodies means for automatically regulating the length of stroke of the part by which the rotating tool is moved toward and from the work and also means for regulating the pressure with which the tool is brought into contact with the work, thus making it possible to adjust the machine to work pieces of varying sizes and also to regulate the pressure so that danger of injury to the rotating tool is overcome. Other objects relate to various features of construction and arrangement of the improved machine which will appear more fully hereinafter.

The nature of the invention will be understood from the following specification taken with the accompanying drawings in which one example of a complete embodiment of the invention and certain modifications of parts thereof are illustrated. In the drawings, Figure 1 shows a side elevation of one form of nut tapping machine embodying the features of the present invention, a portion of the upper part of the casing of this machine being broken away;

Fig. 2 shows a front elevation of the machine illustrated in Fig. 1;

Fig. 3 shows an enlarged side elevation of the upper left-hand portion of the machine illustrated in Fig. 1, a part thereof being illustrated in vertical section;

Fig. 4 shows a partial front elevation of the machine illustrated in Fig. 1, looking toward the right as viewed in Fig. 1, this part of the machine being illustrated partially in vertical section;

Fig. 5 is a partial vertical section taken on the line 5—5 of Fig. 2 showing the cylinder mechanism by which the tool is moved toward and from the work;

Fig. 6 shows an enlarged vertical section taken on the line 6—6 of Fig. 3;

Fig. 9 shows an enlarged horizontal section taken on the line 9—9 of Fig. 4;

Fig. 10 is a vertical section taken on the line 10—10 of Fig. 9 showing parts of the construction of the valve block and associated mechanism for controlling the fluid pressure operated means by which the movements of the tool toward and from the work are effected and controlled;

Fig. 11 shows a vertical section taken on the line 11—11 of Fig. 10;

Fig. 16 is a horizontal section taken on the line 16—16 of Fig. 12;

Fig. 17 is a horizontal section taken on the line 17—17 of Fig. 12;

Fig. 18 is a horizontal section taken on the line 18—18 of Fig. 12;

Fig. 19 is a horizontal section taken on the line 19—19 of Fig. 12;

Fig. 20 is a vertical section taken on the line 20—20 of Fig. 16;

Fig. 21 is a vertical section taken on the line 21—21 of Fig. 9;

Fig. 22 is a vertical section taken on the line 22—22 of Fig. 9;

Fig. 23 is a vertical section taken on the line 23—23 of Fig. 9;

Fig. 24 is a vertical section taken on the line 24—24 of Fig. 9;

Figure 25:
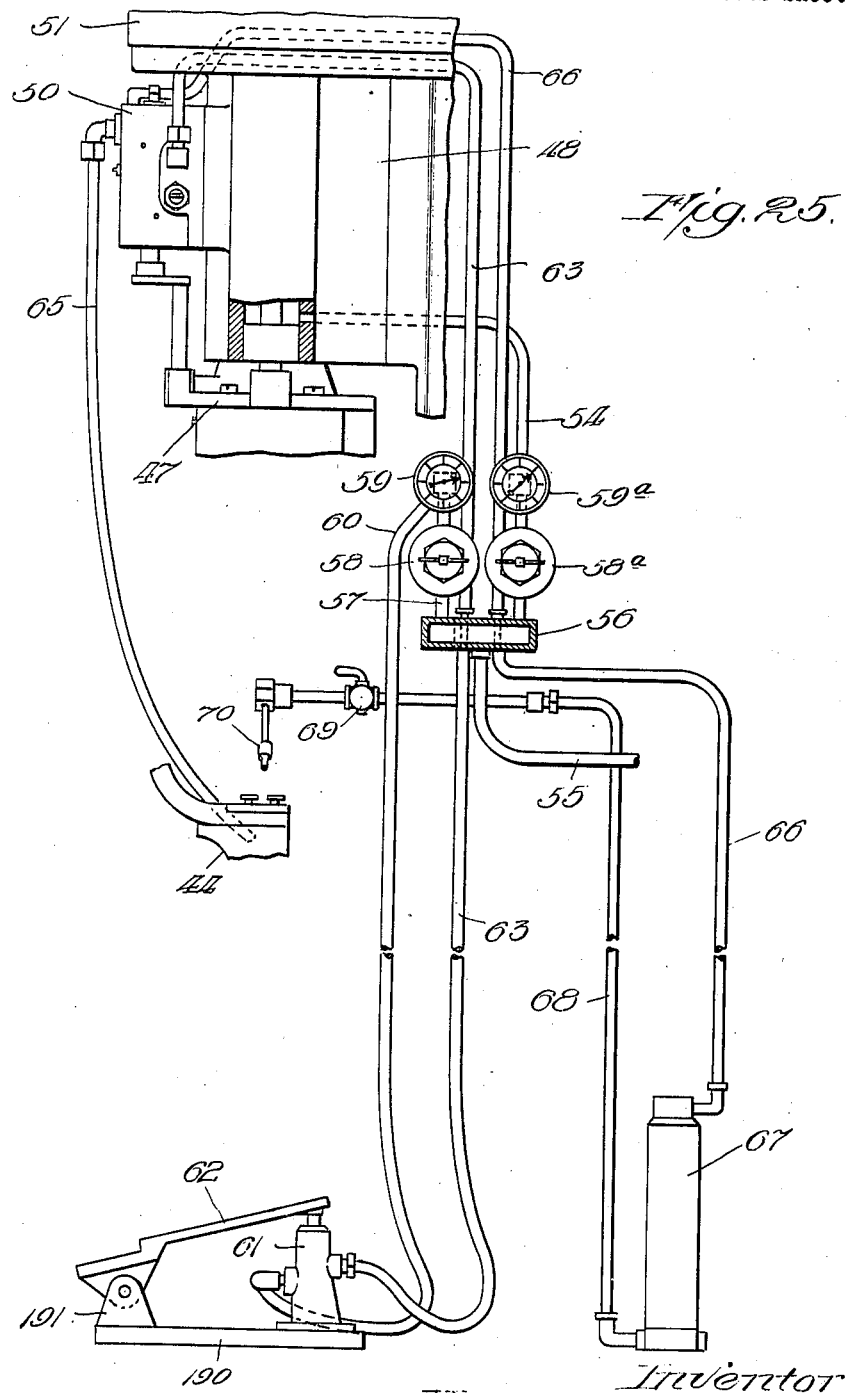
Figure 26:
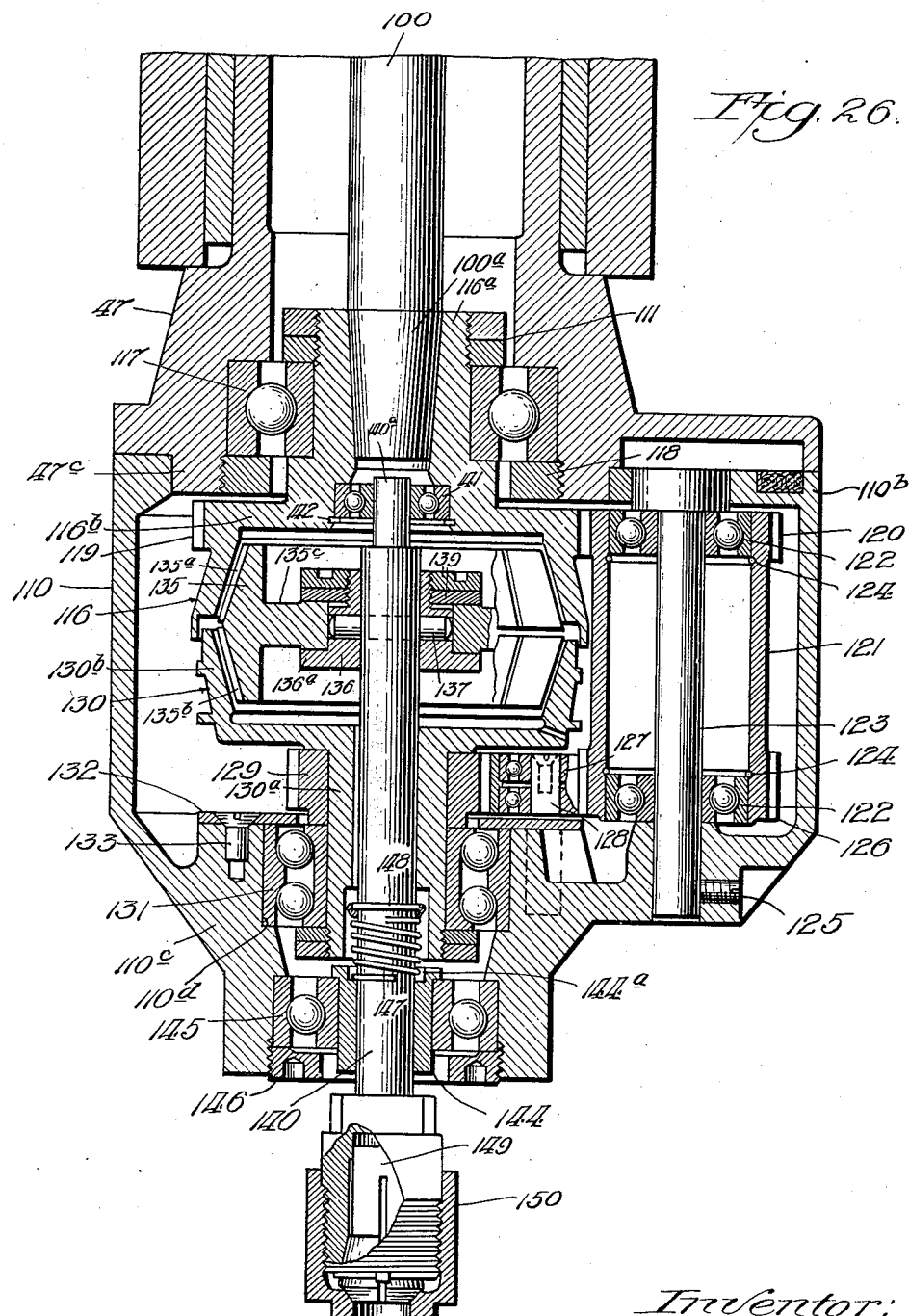

Fig. 25 is a somewhat diagrammatic view of the principal operating parts of the machine with their fluid pressure connections showing the means by which fluid pressure is utilized for controlling the forward and reverse strokes of the tool holder with respect to the work, for controlling the pumping of the fluid to the work and for controlling the feeding of the work to the position where the work is engaged by the tool;

Fig. 26 shows an enlarged vertical section through the automatic reversing unit by which the direction of rotation of the rotating tool is changed automatically at certain points in the movement of the unit as a whole with respect to the work;

Fig. 27 shows a side elevation of the valve mechanism for controlling the admission of compressed fluid to the mechanism by which the movements o fthe tool holder and other operations are effected;

Fig. 28 shows a rear elevation of the valve mechanism illustrated in Fig. 27;

Fig. 29 shows a top plan view of the mechanism illustrated in Fig. 28;

Fig. 30 shows a side elevation of the pedal which is employed by the operator to control the fluid pressure system, with a part of the pedal operated valve illustrated in vertical section;

Fig. 31 shows an enlarged vertical section through a piston type pump capable of use in conjunction with the machine illustrated in the preceding figures of the drawings for effecting the pumping of cooling fluid to the work being operated upon;

Fig. 32 shows a side elevation of a motor operated rotary pump, partially in section, which may be employed in place of the pump illustrated in Fig. 31;

Fig. 33 shows a side elevation of the work holder shown in Fig. 1, part of the holder and feeding channel being shown in vertical section and the adjacent tapping tool being shown in elevation;

Fig. 34 shows a top plan view of the work holder and feeding channel shown in Fig. 33;

Fig. 35 shows an end elevation of the parts illustrated in Fig. 34 with the work-feeding mechanism shown partly in vertical section;

Fig. 36 shows a partial side elevation similar to that of Fig. 3 illustrating a modified form of construction in which successive strokes of the tool holder are controlled by hand; and Fig. 37 shows a front elevation similar to that of the upper part of Fig. 2 of a modified form of machine in which the fluid pressure operated mechanism is employed for effecting the simultaneous operation of a plurality of tool holding and operating devices.

In Figs. 1 to 35, inclusive, of the drawings, the invention is illustrated as being embodied in a nut tapping machine which comprises an upright frame or housing 40 having an enlarged base portion 40a which is adapted to be secured to a floor or other support. This housing is provided on its front side with a vertically slotted guideway 40b on which there is mounted a supporting bracket 41a of a work table 41 which is capable of being adjusted vertically by means of a worm and worm wheel operated by a crank 42 located at one side of the housing. The table is adapted to be secured in its adjusted position by a clamping screw operated by a handle 43. A work holder 44 is mounted on the table 41 to support the nut blanks or other pieces of work and, by the foregoing adjustment of the table, the pieces of work may be located in the proper position with respect to the rotating tap 45 or other tool which is actuated by the driving mechanism of the machine.

The tap 45 is rotated by a reversible driving mechanism 46 carried by a pressure platen 47 mounted below a cylinder block 48 having fluid pressure connections thereto controlled by a valve mechanism 50, by which the pressure platen 47 is moved vertically for the purpose of moving the tap 45 toward and from the work. The cylinder block 48 is mounted on the front face of the casing 40 beneath the overhanging part of a belt casing 51 which is secured to the upper end of the frame or housing 40 and which houses the belt and pulley connections by which the driving shaft of the reversible driving unit 46 is actuated from an electric motor 52. This electric motor is located with its shaft extending vertically in the upper part of the housing 40 and its frame is secured to a plate or bracket 53 capable of being adjusted upon the upper end of the housing 40 for regulating the tightness of the belt or belts by which the reversible driving mechanism of the rotating tap is actuated from the motor.

The feeding of the nut blanks or other pieces of work to the plates where they are engaged by the rotating tool 45 and the movements of the tool 45 toward and from the work are effected by the action of compressed air or other compressed fluid which may also be employed to effect the circulation of cutting oil or cooling fluid to the rotating tool at the point where it engages the work. These fluid pressure connections are illustrated somewhat diagrammatically in Fig. 25 where a supply pipe 55, leading from an air compressor or other source of compressed fluid, is shown as being connected to a pressure supply casing 56 from which connections extend to the cylinder block 48 and the valve mechanism 50. A pipe 57 leads from the casing 56 through a pressure regulator 58 to a pressure indicator 59 from which a supply pipe 60 leads downwardly to a controlling valve 61 adapted to be operated by a foot pedal 62. From the valve 61 a supply pipe 63 leads upwardly at the rear of the casing 56 and through the pulley housing 51 to the valve mechanism 50. Through these connections, the valve mechanism 50 is actuated for controlling the movements of the pressure platen 47 which moves the tool 45 toward the work. From the pressure chamber 56 a pipe 54 leads through a pressure regulator 58a and a gauge 59a to the cylinder block 48 where it communicates through branch pipes 54a, shown in Fig. 8, with passages 48j, leading to the cylinders hereinafter described for causing return strokes of the tool 45. From the valve mechanism 50 an auxiliary compressed fluid line 65 leads downwardly to actuate the mechanism by which the pieces of work are fed in the work holder 44 to a position where they may be engaged by the rotating tool 45. As illustrated in Fig. 25, another compressed air line 66 leads from the valve mechanism 50 to the upper end of an oil pump 67 which may be thus actuated by compressed fluid for pumping oil from a well in the base portion 40a of the housing 40 through a pipe 68 which leads through a valve 69 to a nozzle 70 adapted to discharge the cutting oil on the piece of work being engaged by the tool. In Fig. 1 there is shown a rotary oil pump 71, more fully illustrated in Fig. 32, which may be driven by an electric motor 72 mounted vertically at the side of the housing 40 for pumping the cutting oil to the piece of work being engaged by the tool instead of using the fluid pressure operated pump shown in Fig. 25.

The electric conductors 73 for supplying electric current to the driving motor 52, and also to the pump motor 72, are led into the housing 40 at one side thereof, as shown in Fig. 1. The switch mechanism 74 for controlling the operation and the speed of the motor 52 is preferably mounted on the face of the housing 40 and this housing 40 also preferably encloses, as far as possible, the various pipes by which compressed air or other fluid is conveyed to and from the different parts of the fluid pressure operated mechanisms.

The foregoing description has been intended to give a general view of the principal parts of the machine and, inasmuch as this is a machine in which the nut blanks or other pieces of work are held stationary and the rotating tool is moved toward and from them, the details of the means for holding the work pieces and for moving them into position will be described before entering upon a detailed description of the other parts of the machine. As shown in Figs. 1, 2, 33, 34 and 35, the work holder 44 comprises a bracket 76 having base flanges 76a which are adapted to be clamped by studs 77 to the upper face of the work table 41. This table is of considerable area so that it is adapted to receive the pieces of work which are discharged from the work holder and the table is provided around its edge with a channel 41a adapted to collect the cutting oil which is discharged from the nozzle 70 so that it may be conveyed through suitable channels back to the well in the bottom of the housing 40. The bracket 76 is provided at its upper end with an enlarged head or horizontally extending flange 76b provided with a longitudinally extending groove or channel 76c adapted to receive the nut blanks 78 which are fed thereto through a laterally extending feed channel 79 which curves downwardly to the side of the head 76b from a supply hopper or chamber, not illustrated. The head 76a of the bracket is provided with a laterally extending channel 76d communicating with the feed channel 79 and the blanks 78 are adapted to move by gravity from the hopper through the feed channel 79 and through the branch channel 76d to the channel 76c where they are moved by fluid pressure mechanism from the tapping position occupied by the blank 78a to the position occupied by the blank 78b. The blank 78b is retained against discharge from the channel 76c by a pawl 80 pressed by a spring 81 mounted in a recess in the wall of the channel 76c, and each time that a new blank is fed to the tapping position 78a a tapped blank occupying the position 78b is forced out of the channel 76c against the compression of the spring 81 and then falls upon the table 41 or into any receptacle which may be provided for receiving it. In order to retain the blanks and the tapped nuts or other completed pieces of work within the channels 76c and 76d, guide plates 82 are secured to the head 76b of the work holder at the sides of these channels, these guide plates being spaced upwardly from the head 76b by spacing sleeves 83 through which attaching screws 84 extend into the head 76b for securing the guide plates in place.

For the purpose of feeding the blanks in the channel 76c, as referred to above, a feeding plunger 85 is mounted in the channel 76c to occupy a normal position at one side of the branch channel 76d, as shown in Figs. 34 and 35. This plunger has an inclined end face 85a adapted to engage one of the correspondingly inclined faces of a nut blank occupying the position 78a, and the plunger is adapted to be actuated through a pin 86 which extends downwardly through a slot in the bottom of the head 76b where it is engaged by a piston 87 and also by a coil spring 88. The piston is adapted to effect a forward stroke of the plunger 85 and the coil spring 88 is connected to the cylinder block 89, in which the piston 87 is mounted, so that it effects a return stroke of the plunger 85 and also of the piston. The cylinder block 89 is attached to the underside of the enlarged head 76b of the work holder and the left hand end thereof, as viewed in Figs. 34 and 35, is connected through a coupling 90 with the auxiliary compressed air supply line 65 previously described so that when compressed air is admitted to the pipe 65 through the valve mechanism 50, in a manner to be hereinafter described, the piston 87 is caused to move through a forward stroke, thus actuating the plunger 85 to move a tapped nut blank from the position 78a to the position 78b while at the same time discharging from the channel 76c a completed nut blank or other piece of work which has previously occupied the position 78b. The supply of compressed fluid being then automatically shut off, the spring 88 causes a return stroke of the plunger 85 and of the piston 86 and, at the end of that return stroke, a new nut blank or other piece of work 78 moves from the branch channel 76d into the channel 76c in the working position 78a. In this way, nut blanks or other pieces of work are successively moved to the work position and successively discharged therefrom so that a number of pieces of work may be quickly operated upon by the rotating tool 45.

Figure 7:
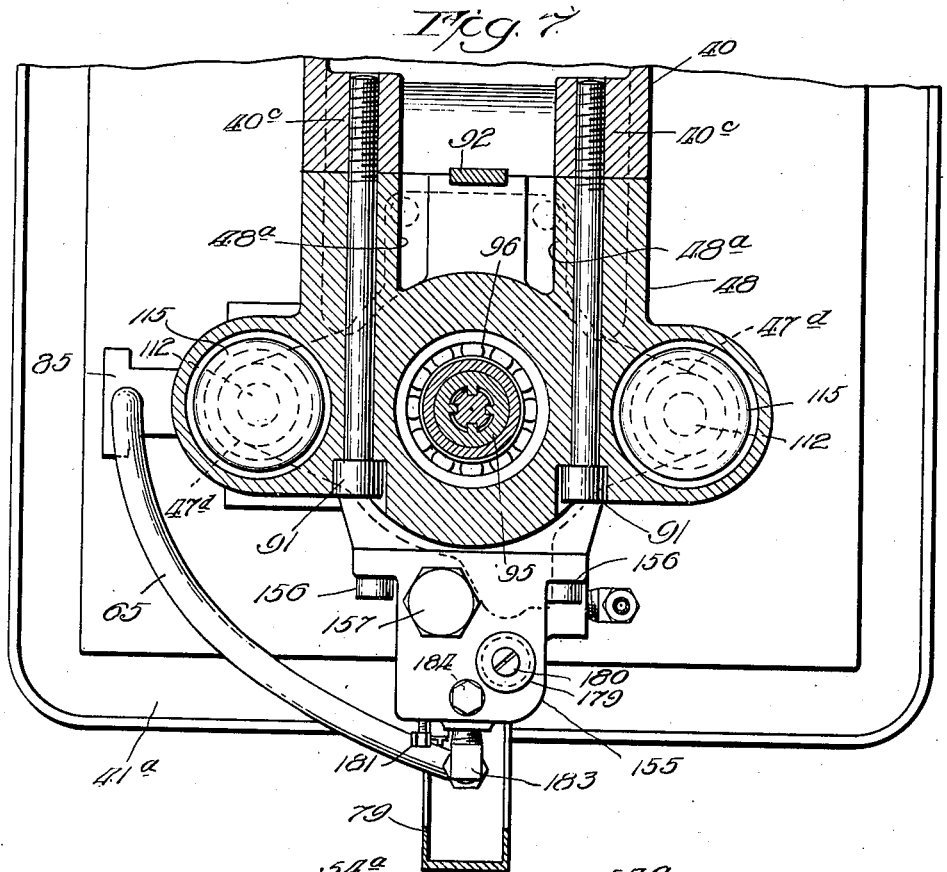
Fig. 7 shows an enlarged horizontal section taken on the line 7—7 of Fig. 4.
Figure 8:
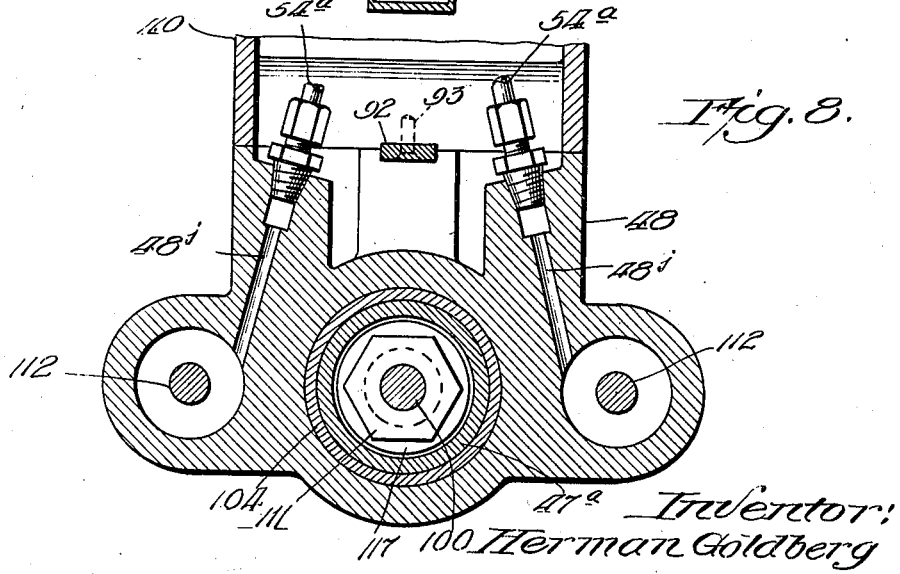
Fig. 8 shows a horizontal section taken on the line 8—8 of Fig. 6.

The means for supporting and actuating the reversible driving mechanism, by which the rotating tool 45 is operated, is best illustrated in Figs. 1 to 8, inclusive, so far as the more general features are concerned. As there illustrated, the cylinder block 48 is shown as being secured to the upper front face of the housing 40 by means of two pairs of studs 91 which pass through apertures formed in the block and through bosses 48a formed thereon and enter threaded apertures formed in bosses 40c carried by the housing, as shown particularly in Fig. 7. In addition, the cylinder block is keyed to the housing by a vertical key 92 which is secured to the housing 40 by a screw 93, as illustrated in Fig. 8. The cylinder block 48, which is thus rigidly attached to the upper part of the housing 40, is fitted on its upper side by the projecting part of the pulley casing 51 and the cylinder block is provided at its upper end with an outward extension 48b adapted to engage the lower annular edge at the projecting part of the casing 51.

The cylinder block is provided with a central bore opening through its upper end and having mounted therein the hollow pulley shaft 95 which is journaled in two sealed ball bearing units 96 fixed within the upper central bore 48c of the block, as shown in Figs. 5 and 6. The pulley shaft 95 has fixed upon the upper end thereof, within the casing 51, a pulley 97 having a plurality of grooves 97a of different diameters formed therein and adapted to be engaged by the driving belt 98 which has a general V-shaped cross section adapted to fit in one of these grooves. The belt 98 is adapted to be driven by another pulley 99 fixed upon the rotor shaft of the driving motor 52. The pulley 99 is similar to the pulley 97, being provided with a plurality of grooves 99a of different diameters which are adapted to receive the belt 98. The two pulleys 97 and 99, each of which has a general cone-shaped form, are directed oppositely on their parallel shafts so that when the belt engages a groove of large diameter on one pulley it will simultaneously engage a groove of similar diameter on the other, except when the belt is mounted on the intermediate grooves which may be of substantially the same diameters. By shifting the belt 98 from one set of grooves to the other, a considerable range of the driving speed of the rotating tool 45 may be attained in addition to that which may be brought about by the adjustment of the speed of the motor 52.

The hollow pulley shaft 95 is provided with a plurality of longitudinal internal teeth adapted to form a splined engagement with the corresponding teeth formed on the upper end of the driving shaft 100 which actuates the reversible driving mechanism 46 previously referred to. By means of this splined connection, the pulley shaft 95 is adapted to drive the shaft 100 in all positions of the platen 47 by which the rotating tool and the reversible driving unit are moved toward and from the work. The upper end of the bore 48c is closed around the pulley shaft 95 by a cover plate 101 which secures in place an annular ring 102 adapted to overlap the upper ball bearing unit 96 and the lower end of the shaft 95 is threaded for engagement by a pair of lock nuts 103 which thus secure the pulley shaft against upward displacement. The cylinder block 48 has its central bore enlarged below the pulley shaft 95 as shown at 48d and this enlarged portion has secured therein a cylindrical bushing 104 which forms a bearing for the tubular bearing member 47a which is formed integrally with the intermediate portion of the pressure platen 47. The driving shaft 100 extends through this tubular bearing member 47a and into the tubular bore 47b which is formed in the lower part of the pressure platen. At this point, the driving shaft 100 is connected to the reversible driving mechanism which is contained in the housing 110 having an aperture 110a in the upper end thereof which is fitted by an annular flange 47c projecting from the lower face of the pressure platen.

The pressure platen 47, upon which the reversible driving mechanism is mounted, is actuated by fluid pressure for the purpose of moving the reversible driving unit and the rotating tool toward and from the work and, for this purpose, it is provided with lateral extensions 47d, shown particularly in Figs. 6 and 7, which are apertured for engagement by the lower reduced extremities 112a of piston rods 112 which are adapted to be actuated by pistons 113 secured thereto and mounted to slide within the cylindrical bores 48e of the cylinder block 48. Each of the cylinders 48e is closed at its lower end by a fixed cylinder head 114 and at its upper end by a removable cylinder head 115 formed as a nut having the reduced part threadedly engaging the reduced threaded end of the cylinder. When the platen 47 is in its uppermost position, determined by the engagement of the central boss 47f thereof with the lower end of the cylinder block, as shown in Fig. 6, the pistons 113 are located slightly below the upper cylinder heads 115, so that compressed fluid may be admitted above these pistons to cause the downward stroke of the pressure platen 47 and a corresponding downward movement of the reversible driving unit and the tool carried thereby. The cylinder block 48 is provided with chambers 48g in its upper part through which access may be had to the removable cylinder heads 115 when the cylinder block has been detached from the housing 40 or when the pulley casing 51 has been removed. The valve mechanism 50 and other parts by which compressed fluid is admitted to the cylinders 47 for causing the forward and reverse strokes of the platen 47 will be described after dealing further with the construction of the reversible driving mechanism.

The reversible driving mechanism is illustrated particularly in Fig. 26 where the shaft 100 is shown as having a tapered lower end 100a which fits within and has a splined engagement with the tapered bore of the hub portion 116a of the hollow driving shell 116. The hub portion of this driving shell is journaled in a sealed ball bearing unit 117 which is secured in position against a shoulder at the upper end of the enlarged bore of the pressure platen by means of a ring nut 118 engaging the internally threaded annular flange 47c previously referred to. A pair of nuts 111 engage the threaded portion of the hub of the driving shell immediately above the ball bearing unit. The hub portion 116a of the driving shell has an annular horizontally extending shoulder 116b seating against the lower face of the inner ring of the ball bearing unit 117 and the driving shell is further provided with an integrally formed reverse driving gear 119 which is arranged to mesh with a pinion 120 formed upon the tubular member 121 which is journaled by means of ball bearing units 122 upon a countershaft 123 secured within a lateral extension 110b of the housing 110. The tubular member 121 is secured upon the ball bearings 122 by split rings 124 and the shaft 123 is secured in place in its bearings by a set screw 125. The lower end of the member 121 has mounted thereon or formed integrally therewith a gear 126 which meshes with an intermediate pinion 127 mounted to revolve on a stub shaft 128 which is fixed in the lower hub portion 110c of the housing 110. This intermediate pinion 127 meshes with a reverse driving gear 129 which is fixed upon the lower hub portion 130a of a reverse driving shell 130. By this arrangement of gearing mechanism, the driving shell 130 is arranged to be driven continuously in a direction opposite to the direction of rotation of the driving shell 116. The hub portion 130a of the reverse driving shell is journaled in a hub portion 110c of the housing 110 through a double ball bearing unit 131 seated in the enlarged bore 110d of the hub and held in place by an annular plate 132 overlapping its upper end and attached to the hub portions of the housing by screws 133.

The annular friction clutch portions 116b and 130b of the driving shell and the reverse driving shell, respectively, are constructed in the form of hollow truncated cones and have inner annular friction driving surfaces adapted to be engaged alternately by the annular driving surfaces 135a and 135b, respectively, which are formed upon the inner driven shell or clutch member 135. This driven shell 135 is provided with an inwardly extending spider 135c which seats against a radially extending flange 136a formed upon a sleeve 136 secured by a transverse pin 137 upon the tap spindle 140. The sleeve 136 is threaded at the end opposite the flange 136a for engagement by lock nuts 139 which clamp the spider 135c against the flange 136a and thus hold the driven shell or clutch member 135 in place.

The driven shell 135 normally occupies a neutral position, shown in Fig. 26, where it does not engage either the driving shell 116 or the reverse driving shell 130 but it is adapted to be brought into engagement with one or the other of these driving shells upon axial movement of the tap spindle 140. This spindle has its upper reduced extremity 140a journaled in the hub portion 116a of the driving shell through an intermediate ball bearing unit 141 held in place by an annular ring 142 and the reduced portion 140a of the spindle is adapted to have longitudinal movement within this ball bearing unit to permit the necessary movement of the driven shell 135. At its lower end, the tap spindle 140 is journaled in a cylindrical sleeve 144 which is journaled in the extremity of the hub portion 110c of the housing 110 through an intermediate ball bearing unit 145. This ball bearing unit engages an annular shoulder on the hub at its upper end and is held in place by a ring nut 146 which threadedly engages the internally threaded lower extremity of the hub portion. The spindle 140 is adapted to slide vertically in the sleeve 144 to the extent necessary to bring the driven shell 135 into driving engagement with one or the other of the driving shells 116 and 130. The driven shell 135 is normally moved to the neutral position shown in Fig. 26 by a coil spring 147 which has one end mounted in a recess 144a formed in the upper end of the sleeve 144 and the other end is arranged to abut against an annular ring 148 secured to the spindle 140 within the bore of the hub portion 130a of the reverse driving shell. This spring is so adjusted that when endwise pressure upon the spindle 140 is removed, the spindle is automatically returned to a position corresponding to the neutral position of the driven shell 135. At its lower end the tap spindle 140 has secured thereon the longitudinally split collet 149 surrounded by the collet nut 150 which may be adjusted on the collet for the purpose of clamping therein the shank of the rotating tap or other tool 45 previously referred to.

It will be apparent from the foregoing description of the reversible driving mechanism 46 that when the pressure platen 47 is lowered to cause the tap 45 to engage a blank 78 held in the work holder 76, the initial engagement of the tap with the blank will cause an upward movement of the tap spindle 140 and of the driven shell 135 mounted thereon with the result that the annular friction surface 135a thereof will be brought into engagement with the internal annular surface of the driving shell 116, thus causing the tap spindle and the tap to be driven by the shaft 100 in the proper direction to cause the tapping of the blank. This tapping operation and the accompanying downward movement of the tap and the reversible driving mechanism, caused by the downward movement of the platen 47, will continue until the tapping of the blank is completed, whereupon the downward movement of the platen 47 is automatically arrested and its return movement, brought about by fluid pressure, automatically begins. At the beginning of this return movement, a longitudinal pull is exerted upon the tap spindle 140, with the result that it is moved downwardly until the annular surface 135b of the driven shell 135 engages the internal annular surface of the reverse driving shell 130, whereupon the reverse driving shell, which is in continuous rotation, causes a reverse rotation of the tap spindle 140 and of the tap 45, so that the tap is automatically withdrawn from the tapped nut while the upward motion of the reverse driving mechanism and of the platen 47 continues. When the tap 45 has become disengaged from the tap nut, the longitudinal pull upon the tap spindle 140 ceases and the coil spring 147 then causes this spindle to assume that position which causes the driven shell 135 to occupy the neutral position shown in Fig. 26.

The valve mechanism 50 heretofore referred to, by which the downward movement of the pressure platen 47 is controlled, comprises a valve block 155 which is attached to the front face of the cylinder block 48 by means of four studs 156 which pass through apertures in the side flanges of the block and enter threaded holes formed in the block 48 as shown, for example, in Figs. 4, 5 and 7. As shown in Figs. 9 to 24, inclusive, the valve block 155 is provided with a vertically extending bore or cylindrical chamber 155a closed at its upper end by a screw threaded plug 157 and at its lower end by a screw threaded plug 158. This cylindrical bore 155a has mounted therein a cylindrical valve plunger 160 provided at its upper end with a projection 160a of reduced diameter which is adapted to engage the upper plug 157 for normally spacing the body portion of the plunger from the upper end of the cylindrical chamber in which it is mounted. The valve plunger 160 is provided with an axial recess 160b extending upwardly from its lower end to receive an elongated coil spring 161 mounted with its lower end in a recess 158a formed in the lower plug 158. This spring tends normally to move the valve plunger 160 to the upper position shown, for example, in Fig. 10. The valve plunger 160 is adapted to control the passage of compressed air or other fluid from the chamber 155a to the upper ends of the cylindrical chambers 48e of the cylinder block 48. This communication is established through a port 155b leading rearwardly through the wall of the chamber 155a, as shown in Figs. 9 and 10, and communicating with a transverse passage 48h formed in the cylinder block 48, as shown in Fig. 9. This transverse passage communicates with diverging branch passages 48i which extend to the upper ends of the cylinders 48e shown in Fig. 6 so that when compressed fluid is admitted through these passages the pistons 113 are forced downwardly against a constant fluid pressure which is maintained in the chambers below these pistons through fluid pressure admitted through the ports 48j connected to the previously described supply pipe 54 shown in Fig. 25. The pressure regulator 58a is so adjusted that the constant pressure below the pistons 113 is always less than the pressure which is admitted through the passages 48i for causing the downward movements of the pistons 113 and the corresponding downward movement of the pressure platen 47 by which the rotating tap is carried.

The compressed fluid for actuating the pistons 113 is admitted to the cylindrical chamber 155a of the valve block 155 through a port 155c leading through the side thereof and spaced some distance below the port 155b so that when the valve plunger 160 is in its uppermost position, as shown in Fig. 10, communication through the chamber 155a between the ports 155b and 155c is cut off by the plunger. The plunger is provided substantially midway between its ends with a comparatively wide annular groove 160b which is adapted to establish communication between the ports 155b and 155c when the plunger 160 has been moved downwardly against the compression of the spring 161 to the position shown in Fig. 23. When the plunger has been moved to that position, the compressed air or other compressed fluid flows through the port 155c to the valve chamber from a larger communicating passage 155d in which there is mounted an adjustable tapered valve member 162 so located that its smaller end partially enters the passage 155c for regulating the rate of admission of the compressed fluid to the valve chamber 155a. This needle valve member 162 is threadedly mounted in a bushing 163 which, in turn, is threadedly mounted in a recess 164 formed in the valve block 155, as shown in Fig. 10. The valve member is provided with a flat projecting extremity 162a which may be engaged by a wrench or the like for the purpose of adjusting its position longitudinally and thereby varying the area of the opening at the mouth of the passage 155c. Compressed fluid is supplied to the passage 155d through a communicating vertically extending passage 155e which is formed in the valve block 155 and which communicates with a transverse supply passage 155f. The last mentioned passage is enlarged at its outer end to form a threaded engagement with a coupling 165 through which a connection is established with the supply pipe 63, previously referred to, leading from the compressed air supply chamber 56. Thus, when the valve plunger 160 has been moved downwardly to the position shown in Fig. 23, a direct communication is established through the valve block from the supply pipe 63 to the port 155b which leads to the cylinders 48e of the cylinder block.

The movements of the valve plunger 160 and the flow of compressed fluid through the various passages of the valve block 155 are controlled by a cylindrical stroke control plunger 170 which is slidably mounted in a cylindrical bore 155g formed in the valve block 155. The control plunger 170 moves in a path parallel to the path of movement of the valve plunger 160 and it is mechanically actuated at predetermined times by the movements of the pressure platen 47. The structural features by which this actuation is effected are shown particularly in Figs. 1, 2, 4, 12 and 13 and they comprise a threaded rod 171 secured at its upper end by a set screw 172 in a threaded axial hole formed in the lower end of the plunger 170. A collar 173 is secured on the rod 171 immediately below the lower end of the plunger 170. The depending threaded portion of the adjusting screw 171 carries a pair of nuts 175 which are adapted to be secured in any adjusted position thereon and the upper one of these nuts is adapted to be engaged by a collar 176 which loosely surrounds the adjusting screw 171 and which is carried at the upper end of a rod 177 fixed at its lower end in a boss 47g formed upon the pressure platen 47, as shown in Fig. 4. The rod 177 is secured in the boss 47g by a set screw 178 and when the pressure platen 47 has moved downwardly to a predetermined extent, the collar 176 engages the upper nut 175 and thus moves the control plunger 170 downwardly to an extent depending upon the extent of movement of the pressure platen. When the pressure platen returns to its normal upper position, shown in Figs. 4 and 6, the collar 176 engages the connecting sleeve 173 and forces the control plunger upwardly again to its uppermost position shown, for example, in Figs. 4, 12 and 13. The control plunger 170 has a circular plate 179 secured to the upper end thereof by a screw 180 and arranged to project beyond its annular surface so that when the control plunger is in its lowermost position, as shown in Fig. 24, this plate rests upon the upper surface of the valve block 155. From the foregoing, it will be apparent that the control plunger has periods of rest in its upper and lower positions while the pressure platen 47 is in motion.

The control plunger 170 is provided with an upper annular groove 170a and a lower annular groove 170b which are adapted to establish communication between different passages of the valve block 155 in the upper and lower positions of the control plunger for the purpose of controlling the flow of compressed fluid to the upper end of the valve plunger 160 and to the auxiliary devices such as the work feeding device and the oil pump, and for controlling the exhaust of the compressed fluid from the chamber 155a and from these various devices.

Figure 14:
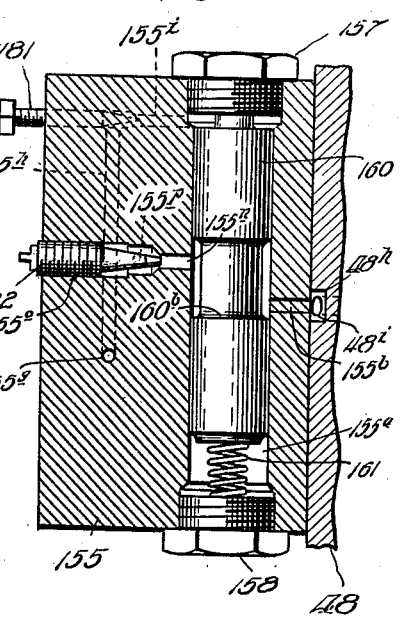
Fig. 14 is a vertical section taken on the line 14—14 of Fig. 12.
Figure 13:
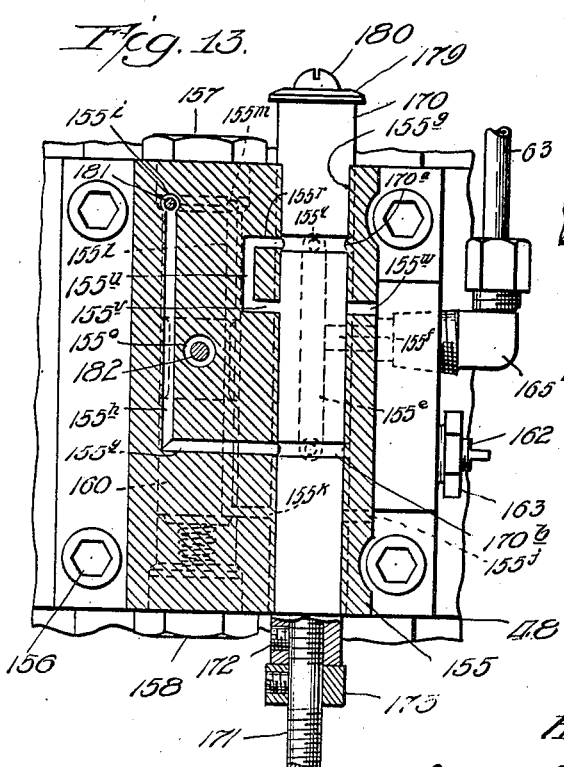
Fig. 13 is a vertical section taken on the line 13—13 of Fig. 9.
Figure 15:
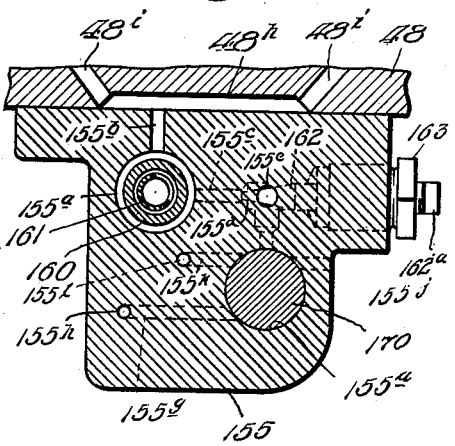
Fig. 15 is a horizontal section taken on the line 15—15 of Fig. 12.

Assuming that the valve plunger and the control plunger 170 are both in their uppermost positions as shown in Figs. 10 and 11, respectively, the admission of air from the supply pipe 63 to the passage 155e causes a flow from that passage through the passage 155d and the communicating horizontal passage 155f and thence around the channel formed by the lower annular groove 170b in the control plunger to a passage 155g extending horizontally through the valve block and communicating with an upright passage 155h, shown in Figs. 13 and 14, which is arranged to communicate at its top with a horizontal passage 155i leading into the enlarged upper end of the valve chamber 155a above the valve plunger 160. The rate of flow of compressed fluid through the passage 155i into the valve chamber is controlled by a needle valve 181 which threadedly engages a passage in the valve block 155 and partially enters the passage 155i so that the opening around the point of the valve may be regulated by adjusting its position in the valve block.

Figure 12:
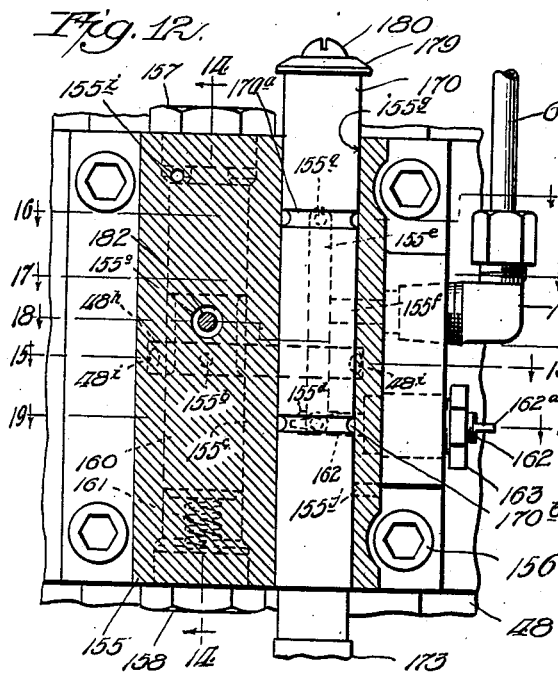
Fig. 12 is a vertical section taken on the line 12—12 of Fig. 9.

When a communication has thus been established between the supply pipe 63 and the upper end of the chamber 155a, through the passages just referred to, the compressed fluid supplied in this manner, which has a greater pressure than that of the spring acting upon the lower end of the valve plunger 160, causes this plunger to move downwardly from the position shown in Figs. 12 and 14 to the position shown by full lines in Fig. 23 and by dotted lines in Figs. 22 and 24. When this valve plunger 160 moves downwardly to the last mentioned position, the annular groove 160b in the valve plunger establishes a communication between the passages 155c and 155b so that the compressed fluid then flows directly from the supply pipe 63 through the communicating passages to the cylinders 48e in which the pistons 113 are mounted so that the pressure platen 47 then immediately moves downwardly from its uppermost position shown in Figs. 1, 2, 4, 5 and 6 to its lower position wherein the rotating tool 45 engages and operates upon the work. This downward movement continues as the tool passes through the work and as the pressure platen moves downwardly through the last part of its movement it carries with it the control plunger 170 through the connecting parts 171, 175, 176 and 177, heretofore described, so that a position is ultimately reached wherein the tapping of the nut blank or the other work to be performed has been completed and the pressure platen and the control plunger 170 have reached the lower limits of their strokes. When that condition has been established, the lower annular groove 170b in the control plunger establishes a communication adapted to exhaust the compressed fluid from the region above the valve plunger 160 so that the valve plunger then returns to its uppermost position under the influence of the coil spring 161. These exhaust connections include a port 155j leading from the annular groove 170b to the atmosphere, as shown in Fig. 22, a horizontal passage 155k leading from the annular groove 170b horizontally through the valve block to a communicating vertical passage 155l which extends upwardly to a horizontal passage 155m communicating directly with the space at the upper end of the valve chamber 155a. As the valve plunger reaches its normal upper position under the influence of the spring 161, the compressed fluid in the cylinders 48e above the pistons 113 is then free to exhaust through the passages 48h, 48i and 155b to the chamber formed by the annular groove 160b in the valve plunger, from which chamber the exhaust fluid flows outwardly to the atmosphere through communicating passages shown particularly in Fig. 18 and comprising a horizontal passage 155n communicating with an enlarged passage 155o in which there is mounted a needle valve 182. The enlarged passage 155o communicates with a transverse passage 155p which opens to the atmosphere so that compressed fluid which has effected the downward movement of the pistons 113 is permitted to escape and these pistons are then allowed to return to their normal uppermost positions under the influence of the compressed fluid which is supplied to the lower sides thereof through the pipe 54 and its branch connections. By regulating the needle valve 182, the rate of exhaust may be adjusted in order to secure any desired speed of the return movement of the pressure platen 47 and of the rotating tool 45 carried thereby.

The movements of the stroke control plunger 170 also control the supply of compressed fluid to the auxiliary devices, such as the device for feeding the pieces of work to the position where they are engaged by the tool 45 and the pump for circulating cutting oil to the work, and the exhaust of the fluid from those devices. When the control plunger 170 is in its upper position, shown in Fig. 11, compressed fluid flows from the upper end of the previously described vertical supply passage 155e through a horizontal passage 155q to the upper annular groove 170a in the control plunger and the fluid then flows around this groove to a horizontal passage 155r, formed in the valve block, through which it passes to a right-angularly disposed passage 155s, shown in Fig. 16, which is enlarged at its outer end to receive a threaded coupling member 183 attached to the end of the auxiliary supply pipe 65, shown in Figs. 25 and 35, which leads to the work feeding device. The enlarged portion of the passage 155s also communicates with a transversely extending passage 155t, shown in Fig. 20, which is illustrated as being closed by a threaded plug 184 but which is adapted, upon removal of the plug, to be connected to the pipe 66, shown in Fig. 25, which leads to the oil pump 67. Thus, the nut blank feeding device and the oil pump are actuated through forward strokes at the instant when the stroke control plunger 170 is in its upper position which is also the time when the pressure platen 47 is elevated and the tool 45 is withdrawn from its working position.

When the control plunger reaches its lower position at the end of the next stroke, the compressed fluid which has just actuated the blank feeding device and the pump is permitted to exhaust through the pipes 65 and 66, the passages 155s and 155t and the passage 155r to a vertical passage 155u, shown in Figs. 12 and 13, which communicates with a horizontal passage 155v adapted, when the control plunger is in its lower position, to establish a communication through the upper groove 170a of the plunger with an exhaust port 155w leading to the atmosphere.

By the mechanism described above it will be apparent that the downward movements of the pressure platen to cause the rotating tool 45 to engage and pass through the work are brought about alternately with the operations of the auxiliary devices so that a new untapped nut blank or other piece of work is fed to the operating position, in line with the axis of the tool 45, during the intervals when the tool is in its elevated position while, at the same time, the pump is operated to feed oil to the blank about to be engaged by the tool on the next downward stroke. The valve mechanism, carried by and formed in the block 155, is so constructed and arranged that, as soon as the pressure platen 47 returns to its uppermost position, under the influence of the constant fluid pressure which is applied continually to the undersides of the pistons 113, compressed fluid admitted through the pipe 63 and operating at a higher pressure immediately brings about another downward movement of the pressure platen by the action of this higher pressure fluid which is admitted above the pistons 113 as soon as the valve plunger 160 moves downwardly to establish a communication between the passage 155c and the passage 155b. That downward movement of the valve plunger 160 is brought about, as pointed out above, by the admission of compressed fluid to the space above the valve plunger through the passage 155i, which, as shown in Fig. 14, is controlled by the needle valve 181. The rate of downward movement of the valve plunger 160 may be regulated by the adjustment of this needle valve and the rate of downward movement of the pressure platen, after the valve plunger 160 has reached its lower position, may be regulated by adjusting the needle valve 182 previously described. The admission of fluid through the passage 155i to the upper end of the valve plunger 160 takes place as soon as the control plunger 170 has been moved to its uppermost position by the corresponding upward movement of the pressure platen 47 and, as soon as compressed fluid has been admitted to the cylinders 48e, above the pistons 113, the pressure platen then begins another downward stroke to bring the tool 45 into engagement with another blank held by the work holder 46. As soon as the tool engages the blank, the reversible driving mechanism contained in the housing 110 is operated to cause the tool 45 to be rotated in the proper direction to tap the nut blank and the downward movement of the pressure platen continues until this tapping operation is completed, the speed of movement being regulated by adjusting the needle valve 162. The control plunger, of course, has a period of rest twice in each cycle, while the arm 176 is moving between the collar 173 and the nuts 175. When the tapping operation has been completed, the control plunger 170 will have been moved to its lowermost position by the last portion of the downward movement of the pressure platen so that the compressed fluid is then permitted to exhaust from the region above the valve plunger 160 and from the region above the pistons 113. When these exhaust connections are established, the pistons 113 are returned to their upper positions by the constant fluid pressure applied below them, thus carrying with them the pressure platen 47 and the control plunger 170. The rate of this return movement may be regulated by adjusting the needle valve 182 which controls the rate of exhaust through the port 155p. By this arrangement, the rotating tap may be caused to travel out of the thread of the tapped nut without injury to the tap or the nut. As soon as the pressure platen and the control plunger reach their uppermost positions again, conditions are established for causing compressed fluid to be admitted again to the upper side of the valve plunger 160 which then moves downward to cause compressed fluid to be again admitted to the upper sides of the pistons 113. In this way, a continuous series of successive downward and upward movements of the pressure platen 47 and of the rotating tool 45 are brought about by the operation of compressed fluid with an automatic starting of the rotation of the tool 45 as soon as it engages the work and an automatic reversal of its direction of rotation as soon as the pressure platen 47 begins to move upwardly.

These repeated operations of the valve plunger 160 and the resulting successive operations of the pistons 113 and of the tool 45 occur, however, in response to the admission of compressed fluid to the valve block 155 through the supply conduit 63, previously referred to, and the flow through this conduit is controlled by the foot operated valve 61 which may be actuated by the operator to cause a flow of compressed fluid to the valve block continuously or only at the times when it is desired to produce operating movements of the pressure platen 47. As shown in Figs. 1, 25 and 30, the foot operated valve 61 comprises a base 190 adapted to be secured to the floor or other support adjacent to the base portion 40a of the casing 40. This base plate 190 has mounted thereon an upwardly extending pedestal 191 upon which the foot pedal 62 is pivoted through depending ears 62a and a pivot pin 193. At the other end of the base plate 190, there is mounted an upwardly extending valve block 194 which has formed therein a vertically extending cylindrical bore 194a in which is mounted a cylindrical valve member 195. This valve member is provided with a rounded upward extremity on which the free end of the foot pedal 62 rests so that when pressure is exerted on the pedal the valve member is forced downwardly against the compression of a coil spring 196 which is seated in a recess in the lower end of the valve member and which is arranged with its lower end engaging a removable disk 197 detachably secured in the lower end of the enlarged chamber 194b which communicates with the bore 194a and which receives the annular flange 195a formed on the lower end of the valve member. The spring 196 thus normally forces the valve member to its uppermost position shown in Fig. 30, wherein the annular flange 195a engages the annular shoulder at the upper end of the chamber 194b.

The valve block 194 is provided on opposite sides with two offset ports 194c and 194d, the first of which communicates through a coupling member 198 with the supply conduit 60, previously described, while the other port 194d communicates through a coupling member 199 with the conduit 63 which leads to the valve block 155. When the valve member 195 is forced downwardly by depressing the pedal 62, the two ports 194c and 194d are connected through the chamber formed by the wide annular groove 195b which is formed in the valve member 195. Thus, as long as the foot pedal 62 is depressed, there is a continuing supply of compressed fluid to the valve mechanism by which the axial forward and reverse movements of the tool 45 are controlled.

The conduit 60, which supplies compressed fluid to the foot operated valve 61, is in turn supplied with compressed fluid through the pressure regulator 58 previously referred to. This pressure regulator and the similar pressure regulator 58a are mounted for convenience adjacent the upper part of the housing 40, the regulator 58 being connected, as previously described, through the pipe or conduit 57 with the constant pressure supply chamber 56. The pressure regulator 58 comprises two casings 202 and 203 which have a threaded engagement with each other and which are adapted to clamp between them a resilient diaphragm 204. A plate 205 is mounted on one side of the diaphragm 204 and a coil spring 206 is mounted between this plate and a collar 207 which is mounted on one end of the adjusting screw 208. This adjusting screw threadedly engages the end of the casing 203 and has a handle 208a which permits the screw to be turned to regulate the compression of the spring 206, after which a lock nut 209 may be used to secure the screw 208 in adjusted position. In this manner, it is possible to regulate the initial compression of the spring 166 which must be overcome by the upward movement of the diaphragm 204 under the influence of the compressed air or other fluid which is admitted to the pressure regulator through the pipe 57. A disk 210 is secured to the face of the diaphragm 204 and this disk is connected by a valve stem 211 with a valve member 212 which is adapted to control the admission of compressed fluid through the port 202a into the chamber 203a adjacent the diaphragm. The valve member 212 carries a block 213 which is engaged at its opposite end by a coil spring 214 capable of being adjusted by a block 215 threadedly engaging an opening in the end of the casing 202. By adjusting this block 215, the compression of the spring 214 may be varied to regulate the pressure with which it normally causes the valve member 212 to engage its seat around the port 202a. The compressed air or other fluid which is supplied through the pipe 57 is admitted through a port 202b to the chamber 202c which is on the inlet side of the valve member 212. The back pressure of the fluid in the pipe 60, leading from the regulator, communicates with the chamber 203a adjacent to the diaphragm through a port 212d. When this back pressure, which is the pressure at which the compressed fluid is supplied to the foot operated valve 61, falls as a result of the flow of fluid to the valve block 155, the diaphragm 204 is moved by the spring 206 with the result that the valve 212 opens the port 202a, thereby admitting additional compressed fluid from the supply pipe 57 to the chamber 203a adjacent the diaphragm. The diaphragm is then moved against the compression of the spring 206, thereby causing the valve 212 to be moved again to its closed position. This additional supply of compressed fluid which is thus admitted to the chamber 203a passes through the pipe 60 and through the pressure gauge 59 to the foot operated valve 61. By suitably adjusting the springs 206 and 214 of the pressure regulator, the frequency and extent of opening of the port 202a by the valve 212 may be regulated in order to maintain any desired pressure in the fluid supplied to the foot operated valve 61. This pressure may be conveniently indicated by the pressure gauge 59 located in the pipe 60 adjacent to the pressure regulator.

The other pressure regulator 58a is similar in construction to the pressure regulator 58 and is utilized to adjust the pressure of the fluid which is supplied through the pressure gauge 59a and the pipe 54 and its branches to the lower ends of the cylinders 48e in which the pistons 113 are mounted. The pressure regulator 58a is adapted to be adjusted to maintain a constant pressure below the pistons 113, the value of which is always less than that of the pressure which is supplied through the pipe 63 to the valve block 155 so that when the admission of compressed fluid to the chambers above the pistons 113 is cut off and the exhaust connections from those chambers are established to the atmosphere, the constant pressure acting on the lower faces of those pistons will immediately restore them to their normal upper positions and cause a corresponding upward movement of the pressure platen 47 and the tool 45. By observing the adjacent gauges 59 and 59a, the pressures of the fluid supplied to the two pipes 63 and 54 may be maintained at the proper magnitudes to bring about the proper operation of the cylinder mechanism.

The fluid pressure operated pump 67, shown in Fig. 25, which is adapted to be operated by compressed fluid admitted thereto through a conduit 66 controlled by the valve mechanism 50, is shown in greater detail in Fig. 31 where it is illustrated as comprising an upright casing 220 adapted to be secured to the bottom of the well in the lower part 40a of the casing 40. This casing is provided in its upper part with a cylindrical bore 220a in which is mounted a reciprocating piston 221. The upper end of the cylinder 220a is closed by a threaded cylinder head 222 having a threaded opening therein to receive the threaded end of the supply pipe 66. From this supply pipe the compressed fluid is adapted to flow through a passage 222a to the chamber above the piston 221. This piston is provided with an upwardly extending reduced projection 221a which is adapted to engage the upper end of another piston or plunger 223 mounted to fit the bore 220b formed in the lower part of the casing 220. This casing is provided with an enlarged chamber 220c surrounding the upper part of the plunger 223 and the part of the plunger which extends through this chamber is surrounded by a coil spring 224 having its lower end seated upon the bottom of the chamber and its upper end engaging a washer 225 which is held in place on the upper end of the plunger by a split ring 226 engaging a groove in the plunger. By this construction, the coil spring 224 normally maintains the piston or plunger 223 and the piston 221 in their uppermost positions. The lower end of the casing 220 is closed by a base block 227 having a threaded projection engaging the internally threaded lower end of the casing. The base block 227 is provided at one side with an inlet port 227a through which oil is adapted to flow into the chamber from the well which is mounted in the bottom portion 40a of the casing 40. A relatively small passage 227b communicates with the port 227a and is normally closed by a ball valve 228 which is pressed against it by a coil spring 229 mounted in a passage 227c in which the ball 228 is adapted to reciprocate. The end of the passage 227c opposite the ball 228 is normally closed by another ball valve 230 which is moved to its closed position by a coil spring 231 mounted in a larger passage 227d which is formed in the base block 227. The coil spring 231 abuts at one end against the ball valve 230 and at the other end against the end of the pipe 68 which threadedly engages the outer end of the passage 227d and which supplies oil to the nozzle 70, as heretofore described. It will be apparent that when the piston or plunger 223 moves upwardly, under the influence of the coil spring 224, the suction created in the bore 220b below the plunger will draw oil from the well into the chamber below the plunger 223 around the ball valve 228 and through the upwardly extending passage 227e which communicates with the bottom of the casing 220. When the compressed fluid is supplied to the pump through the pipe 66, as heretofore described, the resulting downward movement of the piston 221 forces the plunger 223 downwardly and thereby causes an outward flow of oil from the chamber beneath the plunger through the passages 227e and 227d to the supply pipe 68.

In Fig. 32 of the drawings, there is shown a modified form of pump adapted to be driven by the electric motor 72 shown in Fig. 1 for circulating oil from the well at the bottom of the casing 40 to the nozzle 70 adjacent the work being operated upon. This pump 71 comprises a tubular casing 235 enlarged at its lower end as shown at 235a and also enlarged at its upper end as shown at 235b. The lower end of the enlarged portion 235a is closed by a base plate 236 which is secured to the outer flange of the part 235a by studs 237. The base plate 236 has legs 236a adapted to rest upon the bottom of the well within the casing 40 and to space the base plate upwardly so that oil may be drawn in through the ports 236b formed around the central hub portion thereof. Within the tubular casing 235 of the pump, there is mounted a tube 237 in which is located a pump shaft 238 connected to or formed as a continuation of the shaft of the motor 72. The tube 237 is secured in the hub portion 235c of the upper enlarged part of the pump casing and the shaft 238 extends through the upper end of the tube 237 to the motor. In the lower enlarged portion 235a of the pump casing there is mounted a circular plate 239 which has its outer edge spaced from the surrounding pump casing to provide passages, or one annular passage, 240. The plate 239 is secured to the lower end of the tube 237 by connecting members 241 which may also support the plate 239 from the surrounding portion 235a of the pump casing at spaced intervals, leaving a communicating space or communicating spaces 242 which communicate with the spaces 240. Upon the lower end of the pump shaft 238 there is mounted an impeller 244 having vanes 244a which are adapted to draw oil through the ports 236b and to force the oil outwardly and upwardly through the passages 240 and 242 from which the oil passes upwardly through the annular channel 243 between the pump casing and the tube 237. From the upper end of the passage 243 the oil flows outwardly through a side passage 245 to a pipe 246 which may be connected through a coupling 247 to the supply pipe 68 by which oil is conveyed to the nozzle 70.

In Fig. 36 of the drawings there is illustrated a partial side elevation of the upper part of a modified form of machine which is in all respects similar to that previously described except that instead of automatically actuating the valve plunger 170 to pull it downward at the end of the downward strokes of the pistons 113 and pressure platen 47, means are provided for permitting this function to be performed manually while at the same time retaining the advantage of an automatic return of the control plunger 170 at the conclusion of the tapping operation or other operation to be performed. In this modification, an adjusting screw is threaded into or formed integrally with the lower end of the valve plunger 270 which is mounted to slide vertically in a valve block 255 similar to the valve block 155 previously described. This adjusting screw is arranged to be straddled by an arm 276 mounted upon the upper end of a bar 277 which is fixed in a boss 278 carried by the pressure platen of the machine. A collar 273 is secured to the lower end of the plunger 270 by a set screw 274 but this collar serves merely as a stop to engage the lower edge of the valve block for limiting the upward movement of the plunger and it is not engaged by the arm 276 upon the upward movement of the pressure platen. In order to return the valve plunger to its upper position, the adjusting screw 271 is manually pushed in an upward direction by engaging a handle 280 secured to the bottom thereof. Upon the downward movement of the pressure platen, the arm 276 engages the upper one of a pair of nuts 281 which are threaded on the rod 271 so that the control plunger is thereby pulled downwardly by the movement of the pressure platen, as in the form of the construction previously described. In this embodiment of the invention, the initiation of a new downward stroke is brought about by manually elevating the control plunger so that the operator may start the working strokes of the tool at times determined by him.

In Fig. 37 of the drawings there is shown a modified arrangement which is in all respects similar to the construction of the invention previously described except that two units of the invention are mounted side by side and arranged to be operated by the manually controlled device 271—280 shown in Fig. 36. Several machines having independent valve mechanisms and independent reversing mechanisms for their operating tools may be mounted adjacent each other, as shown in Fig. 37, and a single operator may control the movements and operations of several tools by manually manipulating the controlling devices 271—280.

Although one embodiment of the invention has been shown and described by way of illustration, together with modifications of certain features thereof, it will be understood that the invention may be constructed in various other forms coming within the scope of the appended claims.

I claim:

1. The combination in a machine of the class described, of a work holder, a rotatable tool, fluid pressure operated means for moving said tool axially toward and from said work holder to cause said tool to engage the work and to be withdrawn therefrom, and means movable with said tool for automatically causing said tool to rotate in one direction when it engages said work and to reverse the direction of rotation when it starts its withdrawal movement.

2. The combination in a machine of the class described, of a work holder, a rotatable tool, fluid pressure operated means for moving said tool axially toward and from said work holder to cause said tool to engage the work and to be withdrawn therefrom, and means movable with said tool for automatically causing said tool to rotate in one direction when it engages said work and to reverse the direction of rotation when it starts its withdrawal movement, said fluid pressure operated means including means for causing a continuing series of said movements of said tool toward and from the work holder.

3. The combination in a machine of the class described, of a work holder, means for rotating a tool, a cylinder, a piston carrying a part of said tool rotating means and mounted in said cylinder for movement axially of said tool to move said tool toward and from said work holder, means for admitting compressed fluid to said cylinder to move said piston in both directions, and means associated with said last named means for causing a continuing series of said movements of said tool rotating means toward and from said work holder.

4. The combination in a machine of the class described, of a work holder, means for rotating a tool, a cylinder, a piston carrying a part of said tool rotating means and mounted in said cylinder for movement axially of said tool to move said tool toward and from said work holder, means for admitting compressed fluid to said cylinder to move said piston in both directions, and means associated with said tool rotating means for causing the tool to rotate in one direction when it engages the work and for reversing its direction of rotation when the axial movement of the tool is reversed by the movement of said piston in said cylinder.

5. The combination in a machine of the class described, of a work holder, means for rotating a tool, a cylinder, a piston carrying a part of said tool rotating means and mounted in said cylinder for effecting movement of said tool toward and from said work holder, means for admitting compressed fluid to said cylinder to move said part of said tool rotating means away from said work holder, a valve block having passages for supplying compressed fluid to said cylinder for effecting movement of said part of said tool rotating means toward said work holder, means for supplying compressed fluid to said valve block, and a valve plunger slidably mounted in said block for controlling the flow of fluid through said passages.

6. The combination in a machine of the class described, of a work holder, means for rotating a tool, a cylinder, a piston carrying a part of said tool rotating means and mounted in said cylinder for effecting movement of said tool toward and from said work holder, means for admitting compressed fluid to said cylinder to move said part of said tool rotating means away from said work holder, a valve block having passages for supplying compressed fluid to said cylinder for effecting movement of said tool rotating means toward said work holder, means for supplying compressed fluid to said valve block, a valve plunger slidably mounted in said block for controlling the flow of fluid through said passages, and a control plunger mounted in said block and movable with said piston for controlling the actuation of said valve plunger.

7. The combination in a machine of the class described, of a work holder, means for rotating a tool, a cylinder, a piston carrying a part of said tool rotating means and mounted in said cylinder for movement toward and from said work holder, a valve block having passages for supplying compressed fluid to said cylinder for effecting a forward movement of said piston, means for supplying compressed fluid to said valve block, a valve plunger mounted in said block for controlling the flow of fluid through said passages, said valve block having passages for permitting the actuation of said valve plunger by fluid pressure, and a control plunger movable with said piston for controlling the admission of compressed fluid to said valve plunger.

8. The combination in a machine of the class described, of a work holder, means for rotating a tool, a cylinder, a piston carrying a part of said tool rotating means and mounted in said cylinder for movement axially of said tool toward and from said work holder, a valve block having passages for supplying compressed fluid to said cylinder and exhausting it therefrom, a valve plunger mounted in said block for controlling the supply of compressed fluid to said cylinder to effect a movement of said part of said tool rotating means toward said work holder, and means for effecting a return stroke of said piston, said valve plunger being adapted to control said exhaust from said cylinder during said return stroke.

9. The combination in a machine of the class described, of a work holder, means for rotating a tool, a cylinder, a piston carrying a part of said tool rotating means and mounted in said cylinder for movement axially of said tool toward and from said work holder, a valve block having passages for supplying compressed fluid to said cylinder and exhausting it therefrom, a valve plunger mounted in said block for controlling the supply of compressed fluid to said cylinder to effect a movement of said part of said tool rotating means toward said work holder, means for effecting a return stroke of said piston, said valve plunger being adapted to control said exhaust from said cylinder during said return stroke, and a control plunger mounted in said block and actuated by the movement of said piston for controlling the operation of said valve plunger.

10. The combination in a machine of the class described, of a work holder, means for rotating a tool, a cylinder, a piston carrying a part of said tool rotating means and mounted in said cylinder for movement toward and from said work holder, a valve block having passages for supplying compressed fluid to said cylinder and exhausting it therefrom, a valve plunger mounted in said block for controlling the supply of compressed fluid to said cylinder to effect a forward stroke of said piston, means effecting a return stroke of said piston, said block having a bore in which said plunger is mounted and having passages for admitting compressed fluid to said bore to cause said plunger by its movement to admit compressed fluid to said cylinder, and means for effecting a return stroke of said plunger, said block having passages for permitting the exhaust of compressed fluid from said bore during said return stroke of said plunger.

11. The combination in a machine of the class described, of a work holder, means for rotating a tool, a cylinder, a piston carrying a part of said tool rotating means and mounted in said cylinder for movement toward and from said work holder, a valve block having passages for supplying compressed fluid to said cylinder and exhausting it therefrom, a valve plunger mounted in said block for controlling the supply of compressed fluid to said cylinder to effect a forward stroke of said piston, means effecting a return stroke of said piston, said block having a bore in which said plunger is mounted and having passages for admitting compressed fluid to said bore to cause said plunger by its movement to admit compressed fluid to said cylinder, means for effecting a return stroke of said plunger, said block having passages for permitting the exhaust of compressed fluid from said bore during said return stroke of said plunger, and a control member actuated by the movement of said piston for controlling the admission of compressed fluid to said bore and the exhaust of said fluid therefrom.

12. The combination in a machine of the class described, of a work holder, means for rotating a tool, a cylinder, a piston carrying a part of said tool rotating means and mounted in said cylinder for movement toward and from said work holder, means for admitting compressed fluid at one pressure to said cylinder at one side of said piston for moving said tool rotating means away from said work holder, and means for admitting compressed fluid at a higher pressure to said cylinder at the other side of said piston for moving said tool rotating means toward said work holder.

13. The combination in a machine of the class described, of a work holder, means for rotating a tool, a cylinder, a piston carrying a part of said tool rotating means and mounted in said cylinder for movement toward and from said work holder, means for admitting compressed fluid at one pressure to said cylinder at one side of said piston for moving said tool rotating means away from said work holder, means for admitting compressed fluid at a higher pressure to said cylinder at the other side of said piston for moving said tool rotating means away from said work holder, and valve mechanism actuated by the movement of said piston for controlling the application of said last mentioned compressed fluid to said piston and for causing a continuing series of movements of said piston toward said work holder against the action of said first named fluid pressure.

14. The combination in a machine of the class described, of a work holder, means for rotating a tool, a cylinder, a piston carrying a part of said tool rotating means and mounted in said cylinder for movement toward and from said work holder, means for admitting compressed fluid at one pressure to said cylinder at one side of said piston for moving said tool rotating means away from said work holder, means for admitting compressed fluid at a higher pressure to said cylinder at the other side of said piston for moving said tool rotating means away from said work holder, and means for regulating the fluid pressures applied to the opposite sides of said piston.

15. The combination in a machine of the class described, of a work holder, means for rotating a tool, a cylinder, a piston carrying a part of said tool rotating means and mounted in said cylinder for movement toward and from said work holder, means for continuously supplying fluid under pressure to said cylinder at one side of said piston for moving said piston away from said work holder, and means including fluid mechanism controlled by the movements of said piston for automatically admitting compressed fluid having a higher pressure than said first named fluid to said cylinder at the other side of said piston for causing said piston to move periodically toward said work holder.

16. The combination in a machine of the class described, of a work holder, means for rotating a tool, a cylinder, a piston carrying a part of said tool rotating means and mounted in said cylinder for movement toward and from said work holder, means for continuously supplying fluid under pressure to said cylinder at one side of said piston for moving said piston away from said work holder, means including valve mechanism controlled by the movements of said piston for automatically admitting compressed fluid having a higher pressure than said first named fluid to said cylinder at the other side of said piston for causing said piston to move periodically toward said work holder, and means included in said tool rotating means for causing said tool to rotate in one direction when it engages said work and to reverse its direction of rotation when said tool rotating means is moved in a direction away from said work.

17. The combination in a machine of the class described, of a work holder, a rotatable tool, means operated by compressed air for moving said tool axially toward said work holder, means for moving said tool axially in the reverse direction, means for rotating said tool, and means included in said tool rotating means for automatically starting the rotation of said tool when it engages the work and for automatically reversing the direction of rotation of said tool when it starts its reverse axial movement.

18. The combination in a machine of the class described, of a work holder, a rotatable tool, means operated by compressed air for moving said tool axially toward said work holder, means for moving said tool axially in the reverse direction, means for rotating said tool, and means including a reversible friction driving clutch for automatically starting the rotation of said tool when it engages the work and for automatically reversing the direction of rotation of said tool when it starts its reverse movement.

19. The combination in a machine of the class described, of a rotatable tool, a work holder, means operated by compressed air for moving said tool axially toward said work holder, means operated by compressed air for moving said tool axially away from said work holder, means for automatically starting the rotation of the tool when it engages the work and for reversing its direction of rotation when it starts its reverse axial movement, said first named means and said second named means being formed to cause a continuing series of said movements of said tool toward and from said work holder, and means for automatically feeding a piece of work to said work holder during each of the reverse axial movements of said tool.

20. The combination in a machine of the class described, of a work holder, means for rotating a tool, a cylinder, a piston connected with said tool rotating means and mounted in said cylinder for movement axially of said tool toward and from said work holder, means for admitting compressed air to said cylinder to move said piston in both directions, and reverse driving mechanism forming a part of said tool rotating means and mounted for movement with said piston for causing the tool to rotate in one direction when it engages the work and for automatically reversing its direction of rotation when the axial movement of the tool is reversed by the movement of said piston in said cylinder.

21. The combination in a machine of the class described, of a work holder, means for rotating a tool, a cylinder, a piston connected with a part of said tool rotating means and mounted in said cylinder for movement with said tool toward and from said work holder, means for admitting compressed air at one pressure to said cylinder on one side of said piston for moving said tool away from said work holder, means for admitting compressed air at a higher pressure to said cylinder at the other side of said piston for moving said tool away from said work holder, means actuated by the movement of said piston for controlling said last mentioned means, and means actuated by compressed air for moving a piece of work to a position in said work holder during said movement of said tool away from said work holder.

HERMAN GOLDBERG.